(12) United States Patent
Norkin et al.

(10) Patent No.: US 9,414,047 B2
(45) Date of Patent: Aug. 9, 2016

(54) SIGNALING CHANGE OF CAMERA PARAMETER AND/OR DEPTH PARAMETER USING UPDATE MESSAGE

(75) Inventors: Andrey Norkin, Solna (SE); Zhuangfei Wu, Danderyd (SE); Thomas Rusert, Kista (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 263 days.

(21) Appl. No.: 14/238,341

(22) PCT Filed: Jun. 1, 2012

(86) PCT No.: PCT/SE2012/050587
§ 371 (c)(1),
(2), (4) Date: Feb. 11, 2014

(87) PCT Pub. No.: WO2013/025151
PCT Pub. Date: Feb. 21, 2013

(65) Prior Publication Data
US 2014/0192165 A1    Jul. 10, 2014

Related U.S. Application Data

(60) Provisional application No. 61/522,756, filed on Aug. 12, 2011.

(51) Int. Cl.
*H04N 13/02* (2006.01)
*H04N 13/00* (2006.01)
*H04N 19/463* (2014.01)

(52) U.S. Cl.
CPC ......... *H04N 13/025* (2013.01); *H04N 13/0048* (2013.01); *H04N 13/0066* (2013.01); *H04N 19/463* (2014.11)

(58) Field of Classification Search
CPC .............. H04N 13/025; H04N 19/463; H04N 13/0048; H04N 13/0066
See application file for complete search history.

(56) References Cited

U.S. PATENT DOCUMENTS

2001/0048475 A1* 12/2001 Shiomi .............. H04N 5/23248
348/208.99
2002/0007436 A1* 1/2002 Yoshida ............... H04N 9/8042
711/105

(Continued)

FOREIGN PATENT DOCUMENTS

CA  2 745 392 A1   6/2010
EP  2 286 596      12/2009

(Continued)

OTHER PUBLICATIONS

European Office Action—Communication pursuant to Article 94(3) EPC,corresponding to European Application No. 12 738 249.7-1905, mailed Nov. 19, 2014.

(Continued)

*Primary Examiner* — Jay Patel
*Assistant Examiner* — Joseph Suh
(74) *Attorney, Agent, or Firm* — Myers Bigel & Sibley, P.A.

(57) ABSTRACT

An encoder and a method therein for providing an update message relating to at least one of camera parameters and depth parameters "the parameters", a decoder and a method therein for decoding the update message, a first device including the encoder and a second device including the decoder are provided. The parameters enable the decoder to synthesize a first view for a first camera position based on a second view for a second camera position and the parameters of the second view. The encoder detects which of the parameters are changing over time. Next, the encoder modularizes the parameters into a respective module. Furthermore, the encoder encodes each respective module into the update message and sends the update message to the decoder. Next, the decoder decodes each respective module of the update message to obtain the parameters which are to be updated.

26 Claims, 6 Drawing Sheets

(56) References Cited

U.S. PATENT DOCUMENTS

| | | | |
|---|---|---|---|
| 2002/0122117 A1* | 9/2002 | Nakagawa | H04N 5/232 348/218.1 |
| 2002/0175994 A1* | 11/2002 | Sakakibara | G01B 11/24 348/135 |
| 2003/0147463 A1* | 8/2003 | Sato | H04N 19/40 375/240.05 |
| 2004/0032980 A1* | 2/2004 | Harman | G06T 7/0022 382/154 |
| 2004/0247159 A1* | 12/2004 | Damera-Venkata | G06T 7/20 382/107 |
| 2004/0260669 A1* | 12/2004 | Fernandez | G06F 17/30017 |
| 2005/0244071 A1* | 11/2005 | Zaharia | G06T 9/007 382/251 |
| 2006/0165315 A1* | 7/2006 | Ernst | G06T 7/0071 382/302 |
| 2006/0222252 A1* | 10/2006 | Lee | H04N 13/0066 382/239 |
| 2006/0262865 A1* | 11/2006 | Moran | G10L 21/0272 375/257 |
| 2007/0172071 A1* | 7/2007 | Mehrotra | H04S 3/008 381/23 |
| 2008/0137059 A1* | 6/2008 | Piestun | G01C 3/08 356/4.01 |
| 2008/0204407 A1* | 8/2008 | Ueno | A63F 13/04 345/156 |
| 2009/0092311 A1* | 4/2009 | Kim | G06T 7/002 382/154 |
| 2009/0096790 A1* | 4/2009 | Wiedemann | G06K 9/00201 345/427 |
| 2009/0244091 A1* | 10/2009 | Horio | H04N 7/173 345/619 |
| 2010/0079598 A1 | 4/2010 | Ke et al. | |
| 2010/0114445 A1* | 5/2010 | Groult | B60T 7/22 701/70 |
| 2010/0178982 A1* | 7/2010 | Ehrman | A63F 7/0664 463/37 |
| 2010/0194856 A1* | 8/2010 | Varekamp | H04N 13/0022 348/42 |
| 2011/0044550 A1* | 2/2011 | Tian | H04N 19/597 382/238 |
| 2011/0150271 A1* | 6/2011 | Lee | G06K 9/00335 382/103 |
| 2011/0242278 A1* | 10/2011 | Yang | H04N 13/0022 348/43 |
| 2011/0261883 A1* | 10/2011 | Bang | H04N 19/597 375/240.13 |
| 2011/0267440 A1* | 11/2011 | Kim | G06T 7/002 348/55 |
| 2011/0288806 A1* | 11/2011 | Turbell | G01B 11/2504 702/104 |
| 2011/0304708 A1* | 12/2011 | Ignatov | H04N 13/0022 348/51 |
| 2011/0310982 A1* | 12/2011 | Yang | H04N 13/0003 375/240.26 |
| 2011/0317766 A1* | 12/2011 | Lim | H04N 19/597 375/240.16 |
| 2012/0002024 A1* | 1/2012 | Choi | H04N 5/60 348/54 |
| 2012/0147152 A1* | 6/2012 | Vogiatis | G06T 7/0065 348/50 |
| 2012/0320986 A1* | 12/2012 | Shimizu | H04N 19/597 375/240.16 |
| 2013/0018826 A1* | 1/2013 | Sundararajan | H04L 12/6418 706/12 |
| 2013/0060544 A1* | 3/2013 | Bakker | G01V 1/28 703/2 |

FOREIGN PATENT DOCUMENTS

| | | |
|---|---|---|
| JP | 2009-512316 | 3/2009 |
| WO | WO 2006/104351 A1 | 10/2006 |
| WO | WO 2010/141927 A1 | 12/2010 |

OTHER PUBLICATIONS

International Search Report, PCT/SE2012/050587, Oct. 15, 2012.
Written Opinion of the International Searching Authority, PCT/SE2012/050587, Oct. 15, 2012.
Written Opinion of the International Preliminary Examining Authority, PCT/SE2012/050587, Aug. 2, 2013.
International Preliminary Report on Patentability, PCT/SE2012/050587, Oct. 21, 2013.
Dave Marshall: "Differential Encoding", Oct. 4, 2001, XP002684059, 2 pages; Retrieved on Sep. 25, 2012, from the internet: URL:http://www.cs.cf.ac.uk/Dave/Multimedia/node232.html.
"Information technology—Coding of audio-visual objects—Part 10: Advanced Video Coding", International Standard, Reference No. ISO/IEC FDIS 14496-10:201X(E), 6$^{th}$ Edition, Geneva, Switzerland 2010; 716 pp.
Thomson Inc. & Philips Electronics: "On 2D + Depth SEI Message", International Organisation for Standardisation Organisation Internationale de Normalisation ISO/IEC JTC1/SC29/WG11 Coding of Moving Pictures and Audio, MPEG 2009/M16320, Apr. 2009, Maui, USA; 9 pp.
Video and Requirement; "Call for Proposals on 3D Video Coding Technology", International Organisation for Standardisation Organisation Internationale de Normalisation ISO/IEC JTC1/SC29/WG11 Coding of Moving Pictures and Audio, MPEG 2011/N12036, Mar. 2011, Geneva, Switzerland 20 pp.
Sehoon Yea et al.: "Revised syntax for SEI message on multiview acquisition information", Joint Video Team (JVT) of ISO/IEC MPEG & ITU-T VCEG (ISO/IEC JTC1/SC29/WG11 and ITU-T SG16 Q.6) 26$^{th}$ Meeting: Antalya, TR, Jan. 13-18, 2008; Document: JVT-Z038r1; 27 pp.
ITU-T Recommendation H.264 "Advanced video coding for generic audiovisual services" *Series H: Audiovisual and Multimedia Systems, Infrastructure of audiovisual services—Coding of moving video* (10 pages) (Mar. 2010).
Notice of Reasons for Rejection corresponding to Japanese Patent Application No. 2014-524967 (4 pages) (issued Mar. 29, 2016).
Okubo, Sakae "H.264/AVC Textbook" First Edition (26 pages) (Jan. 1, 2009).
Senoh et al. "Requirements for depth information: Proposal" *Joint Video Team (JVT) of ISO/IEC MPEG & ITU-T VCEG, 25$^{th}$ Meeting: Shenzhen, CN* (10 pages) (Oct. 21-26, 2007).
Tian et al. "On Spatially Interleaved Pictures SEI Message" *Joint Video Team (JVT) of ISO/IEC MPEG & ITU-T VCEG, 30$^{th}$ Meeting: Geneva, CH* (10 pages) (Jan. 29-Feb. 3, 2009).

* cited by examiner

Prediction follow display order

Fig. 5b  CM0 → CM1 → CM2 → CM3 → CM4

Prediction follow decoding order

Prediction following decoding order (alternative)

SIGNALING CHANGE OF CAMERA PARAMETER AND/OR DEPTH PARAMETER USING UPDATE MESSAGE

CROSS REFERENCE TO RELATED APPLICATION

This application is a 35 U.S.C. §371 national stage application of PCT International Application No. PCT/SE2012/050587, filed on 1 Jun. 2012, which itself claims the benefit of U.S. provisional Patent Application No. 61/522,756, filed 12 Aug. 2011, the disclosures and contents of both of which are incorporated by reference herein in their entirety. The above-referenced PCT International Application was published in the English language as International Publication No. WO 2013/025151 A1 on 21 Feb. 2013.

TECHNICAL FIELD

Embodiments herein relate to multi-view displays and view synthesis technologies. In particular, an encoder and a method therein for providing an update message relating to at least one of camera parameters and depth parameters and a decoder and a method therein for decoding an update message relating to at least one of camera parameters and depth parameters are disclosed.

BACKGROUND

The area of three dimensional (3D) video and three dimensional television (3DTV) is gaining momentum and is considered the next logical step in consumer electronics, mobile devices, computers and the movies. The additional dimension on top of two dimensional (2D) video offers multiple different directions for displaying the content and improves the potential for interaction between viewers and the content.

A new generation of auto-stereoscopic displays allows the viewer to experience depth perception without glasses. These displays project slightly different pictures in the different directions as shown in FIG. 1, which illustrates an exemplifying display scheme. Therefore, if the viewer is located in a proper position in front of the display, his/her left and right eye see slightly different pictures of the same scene, which make it possible to create the perception of depth. In order to achieve smooth parallax and change of the viewpoint when the user moves in front of the screen, a number of views, typically 7-28, are generated. A view is a picture or a video of the scene taken from a certain camera position.

When using the above mentioned approach, a problem may be that transmission of the views may require a high bit rate. However, the problem can be overcome by transmitting a lower number, e.g. 1 to 3, of key views and generating the other views by the so-called view synthesis process from the transmitted key views. These synthesized views can be located between the key views (interpolated) or outside the range covered by the key views (extrapolated).

One of the view synthesis techniques is Depth Image Based Rendering (DIBR). In order to facilitate the view synthesis, DIBR uses depth map(s) of the key view(s) (could theoretically also be depth maps of other views). A depth map can be represented by a grey-scale image having the same resolution as the view, such as a video frame. Then, each pixel of the depth map represents the distance from the camera to the object for the corresponding pixel in the image/video frame.

There are a number of parameters that may be used in view synthesis. These parameters may be referred to as view synthesis related parameters.

In order to facilitate the DIBR view synthesis, the number of parameters needs to be signaled for the device or program module that performs the view synthesis. Among those parameters are first of all z_near and z_far that represent the closest and the farthest depth values in the depth maps for the frame under consideration. These values are needed in order to map the quantized depth map samples to real depth values that they represent (one of the formulas below). The upper formula is used if all the depth values from the origin of the space are positive or all negative. Otherwise, the formula below is used.

$$Z = \frac{1.0}{\frac{v}{255.0} \cdot \left(\frac{1.0}{Z_{near}} - \frac{1.0}{Z_{far}}\right) + \frac{1.0}{Z_{far}}} \quad (1)$$

$$Z = Tz + \frac{1.0}{\frac{v}{255.0} \cdot \left(\frac{1.0}{Z_{near}} - \frac{1.0}{Z_{far}}\right) + \frac{1.0}{Z_{far}}}. \quad (2)$$

These formulas 1, 2 are used for translating quantized depth value to real depth value. Variable v represents luminance value for each pixel in a grey-scale depth image (for 8-bit depth map, between 0 and 255). Tz represents a z component (z coordinate) of translation vector.

Another set of parameters that is needed for the view synthesis are camera parameters.

The camera parameters for the 3D video are usually split into two parts. The first part that is called the intrinsic (internal) camera parameters represents the optical characteristics of the camera for the image taken, such as the focal length, the coordinates of the images principal point and the radial distortion. The extrinsic (external) camera parameters, in their turn represent the camera position and the direction of its optical axis in the chosen real world coordinates (the important aspect here is the position of the cameras relative to each other and the objects in the scene). It shall here be noted that the extrinsic parameters, or extrinsic camera parameters, may include translation parameters, which may be comprised in a translation vector. Both intrinsic and extrinsic camera parameters are required in the view synthesis process based on usage of the depth information (such as DIBR).

As an alternative to the DIBR solution above, a Layered Depth Video (LDV) may be utilized. The LDV solution uses multiple layers for scene representation. These layers can be foreground texture, foreground depth, background texture and background depth.

In order to make different devices compatible with respect to how camera parameters and the like are signaled, ways of how to send the camera parameters to the decoder have been standardized.

One of these standardized ways is defined in the Multi-view Video Coding (MVC) standard, which is defined in the annex H of the well-known Advanced Video Coding (AVC) standard, also known as H.264. The scope of MVC covers joint coding of stereo or multiple views representing the scene from several viewpoints. The standard eventually exploits correlation between these views of the same scene in order to achieve better compression efficiency comparing to compressing the views independently. The MVC standard also covers sending the camera parameters information to the decoder. The camera parameters are sent as Supplementary Enhancement Information (SEI) message. The syntax of this SEI message is shown in Table 0.1.

A contribution to the Moving Pictures Experts Group (MPEG) standardization has also proposed to signal the z_near and z_far values to the decoder. The proposed syntax for signaling z_near and z_far parameters is shown in Table 0.2.

One can see from Table 0.1 that camera parameters are sent in floating point representation. The floating point representation allows to support a higher dynamic range of the parameters and to facilitate sending the camera parameters with higher precision. The higher precision of the camera parameters is important for the view synthesis that has been shown by Vetro et al.

In many video coding standards/solutions, in order to get higher coding efficiency and support temporal scalability, video pictures may be coded in a different order than their display order. One of the examples of such coding structure is hierarchical B coding, which extensively uses bi-directional picture prediction.

In H.264/AVC, both coding order and display order are signaled in Network Abstraction Layer (NAL) unit header, represented by Frame Number and Picture Order Count (POC) respectively. A decoder shall follow non-decreasing order of Frame Number to decode a sequence. A display, on the other hand, shall follow increasing POC order to render the image on the screen. FIG. 2 shows the concept of different coding order and display order.

Even though the methods above, such as DIBR and LDV, reduce the bit rate between the encoder and the decoder, it would be desired to further reduce the required bit rate.

SUMMARY

An objective is to reduce bit rate needed between an encoder and a decoder.

This objective is solved by introduction of a new syntax for sending camera parameters and/or depth parameters by using an update message, such as a modified SEI message or other means. Such other means may be that the parameters are sent in a bitstream and use some other representation than the modified SEI message.

Accordingly, a method is provided in an encoder for sending the camera and/or depth parameters in a bandwidth-efficient way.

Thus, the objective is achieved by a method in an encoder for providing an update message relating to at least one of camera parameters and depth parameters. The at least one of the camera parameters and the depth parameters enables a decoder to synthesize a first view for a first camera position based on a second view for a second camera position and said at least one of the camera parameters and the depth parameters. The at least one of the camera parameters and depth parameters relate to the second view. The encoder detects which of said at least one of the camera parameters and the depth parameters are changing over time. Next, the encoder modularizes the detected said at least one of the camera parameters and the depth parameters into a respective module. Then, the encoder encodes each respective module into the update message and sends the update message to the decoder.

According to a further aspect, the objective is achieved by an encoder configured to provide an update message relating to at least one of camera parameters and depth parameters. The at least one of the camera parameters and the depth parameters enables a decoder to synthesize a first view for a first camera position based on a second view for a second camera position and said at least one of the camera parameters and the depth parameters, wherein said at least one of the camera parameters and the depth parameters relate to the second view. The encoder comprises a processing circuit configured to:

detect which of said at least one of the camera parameters and the depth parameters are changing over time;

modularize said at least one of the camera parameters and the depth parameters into a respective module;

encode each respective module into the update message; and send the update message to the decoder.

According to some embodiments, a first device comprises the encoder. The first device may be a first user equipment or the like as exemplified in the detailed description.

Furthermore, a method in a decoder is provided for receiving the camera and/or depth parameters and to use said camera and/or depth parameters for synthesizing camera views.

Thus, the objective is achieved by a method in a decoder for decoding an update message relating to at least one of camera parameters and depth parameters. The at least one of the camera parameters and the depth parameters enables the decoder to synthesize a first view for a first camera position based on a second view for a second camera position and said at least one of the camera parameters and the depth parameters. The at least one of the camera parameters and the depth parameters relate to the second view. The decoder receives the update message from an encoder, wherein the update message comprises a respective module for at least one of the camera parameters and the depth parameters. Next, the decoder decodes each respective module of the update message to obtain said at least one of the camera parameters and the depth parameters which are to be updated.

According to yet another aspect, the objective is achieved by a decoder configured to decode an update message relating to at least one of camera parameters and depth parameters. The at least one of the camera parameters and the depth parameters enables the decoder to synthesize a first view for a first camera position based on a second view for a second camera position and said at least one of the camera parameters and the depth parameters. The at least one of the camera parameters and depth parameters relate to the second view. The decoder comprises a processing circuit configured to:

receive the update message from an encoder, wherein the update message comprises a respective module for at least one of the camera parameters and the depth parameters; and decode each respective module of the update message to obtain said at least one of the camera parameters and the depth parameters.

According to some embodiments, a second device comprises the decoder. The second device may be a second user equipment or the like as exemplified in the detailed description.

According to embodiments herein, the camera and/or depth parameters are split into logical blocks, or modules. Then, only those camera parameters and/or the nearest and farthest depth values (z_near and z_far), which are changing in the current frame as compared to a previous frame, are sent to the decoder. This can reduce the bitrate required to send the information to the receiver.

In order to further decrease the required bit rate for the parameters, signaling of incremental changes to the camera and/or depth parameters is performed according to some embodiments, which relates to prediction of camera and/or depth parameters. The incremental changes are sent as a difference between real camera and/or depth parameters and estimated camera and/or depth parameters.

Thus, in some embodiments, a predictor, such as a calculation formula, may also be used in order to send the camera and/or depth parameters more efficiently. Then, the difference between the real and predicted values of the parameters (or prediction error) is sent. Therefore, the amount of information sent between the encoder and the decoder is decreased.

According to further embodiments, the incremental changes of camera and/or depth parameters may also be efficiently combined with inter-picture (inter-frame) prediction structure. Inter-picture prediction structure may be based on hierarchical encoding. As an example, inter-pictures (inter-frames) may be hierarchical B-frames, P-frames or the like. Then updates of the camera parameters are sent and are calculated in the coding order of the frames. This allows the receiver to drop the update message, such as the modified the SEI message, for the higher hierarchy layers without affecting the prediction of the camera parameters and/or depth parameters.

Here and further in this document the term "parameters" assumes both extrinsic and intrinsic camera parameter, the nearest and the farthest depth values referred to as $z\_near$ and $z\_far$ in the current frame/camera and also other meta-data information related to the view synthesis. Throughout the present disclosure "at least one of the camera parameters and the depth parameters" is understood to mean "the camera parameters and/or the depth parameters".

An advantage with embodiments herein is that more efficient signaling of parameters is enabled. The more efficient signaling may be realized by for example use of the update message and other ways of signaling the camera parameters and $z\_near\ z\_far$ values in case when the some of the camera parameters and/or $z\_near$, $z\_far$ values are changing over time. Embodiments herein decrease the bitrate, required to signal the parameters.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Figure 1:
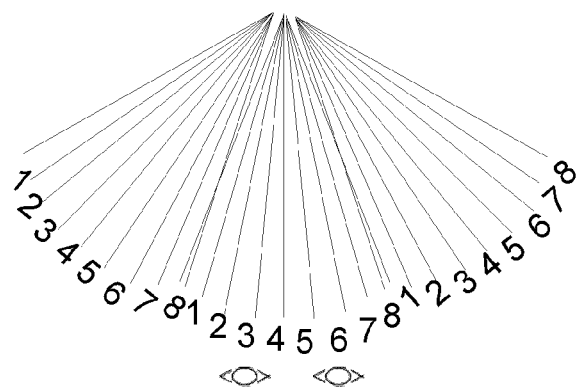
FIG. 1 is an overview of a number of views presented in different directions of an auto-stereoscopic display.
Figure 2:
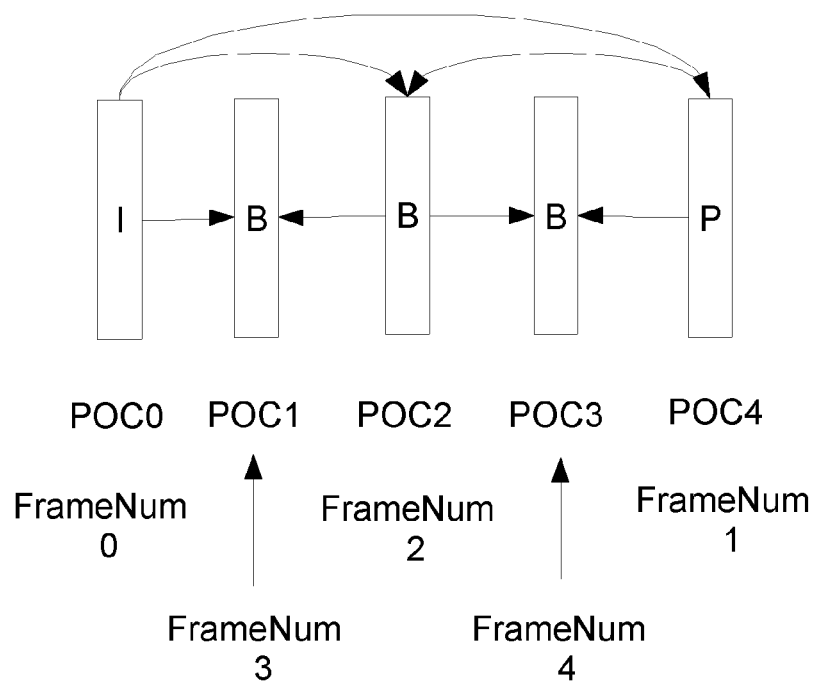
FIG. 2 is an illustration of coding order and display order.

One problem with the above presented existing solutions is that the multi-view acquisition information SEI messages include all the camera parameters. This would work well if the same camera parameters are valid for the whole video sequence, i.e. if the parameters are relatively constant over time. However, some multi-view sequences can have certain camera parameters that are constant and other camera parameters that change over time. Some of the parameters, e.g. a translation vector as well as $z\_near$ and $z\_far$ parameters, may change every frame, while some parameters may be constant for an entire sequence of frames. It is also quite common for certain types of content that the minimum and the maximum depth values $z\_near$ and $z\_far$ vary with every frame. As the camera parameters and $z\_near$, $z\_far$ values are sent using a floating point representation, resending all the set of parameters for every camera and every single frame may mean that some additional amount of bits are required to be sent. Therefore, it is desirable to reduce the number of bits required for representing the camera parameters and/or depth parameters in a coded video sequence.

Another problem with a mechanism that carries camera parameters for all views in a single SEI message is that if "view scalability" is used, i.e. a subset of M<N views is extracted from a N view sequence (by means of bit stream extraction), then the SEI message would have to be rewritten in order to reflect the new M-view representation, i.e. parameters for views that have not been extracted would have to be removed from the message. Such rewriting process can cause undesirable complexity and delays.

Before proceeding with the detailed description a few terms will be briefly explained.

The term "frame" refers to a picture. Thus, two frames may be two pictures (without any restriction on temporal or position alignment). Two frames may correspond to the same or different time instances or to the same or different views, i.e. different camera positions. Typically, when two frames correspond to the same time instance, the two frames relate to different views. Also, it is typical that when two frames correspond to the same view, the two frames relate to different time instance. The time instances may be consecutive or non-consecutive.

As mentioned, the term "view" is a frame or a sequence of frames taken of a scene from a certain camera position.

A term "inter-view prediction" relates to predicting a partition in a picture from another picture that relates to another view, e.g. a camera position, which may be virtual or real.

A term "temporal prediction" relates to predicting a partition in a picture from another picture that belongs to the same view but to a different time instance, or moment in time.

For completeness, but not used herein, a term slice refers to terminology of H.264, MVC, High Efficiency Video Coding (HEVC) and related standards. Slice is a part of a picture comprising an integer number of macroblocks (or CUs), usually in a raster-scan order (not necessarily in HEVC). Therefore, a slice may be a part of a picture. A slice may also comprise the entire picture, but not always. Generally, in H.264 a slice may be inter- or intra predicted. There is a type of a slice in H.264 and MVC that is called IDR slice. If one of the slices is IDR, than all other slices in the same picture should also be IDR slices. However, in other cases, a picture may comprise both inter and intra-predicted slices.

Herein the term "intra-predicted" picture (frame) is used to refer to the picture that does not use (or is not allowed to use) inter-prediction. The term "inter-predicted" picture (frame) is used to refer to the picture that uses (or is allowed to use) inter-prediction.

Moreover, as used herein the term "real" when used in conjunction with camera and/or depth parameter is meant to refer to camera and/or depth parameters available at the encoder when encoding. These available parameters are real in view of the camera and/or depth parameters extracted, or predicted, at the decoder.

Figure 3:
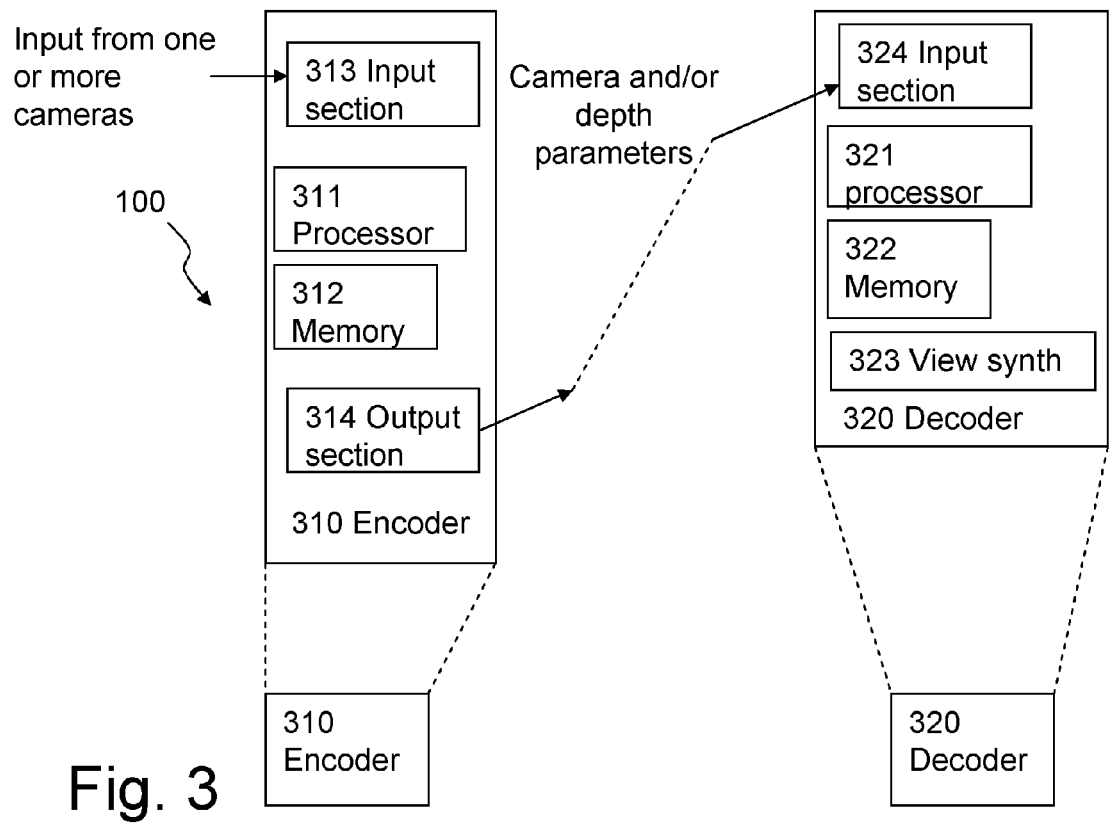
FIG. 3 is an overview of a system in which embodiments may be implemented.

FIG. 3 is an overview of a communication system 100, such as a radio communication system, a multimedia system or the like, in which embodiments herein may be implemented.

The communication system 100 comprises an encoder 310 and a decoder 320.

The encoder 310 comprises a processing circuit 311, such as a processor. The processing circuit 311 may be configured to configure and/or compress camera and depth parameters. Depth parameters may be referred to as depth map parameters (with z_near z_far values as an example).

Furthermore, the encoder 310 comprises an input section 313 for receiving input from a camera, an array of cameras or from a 3D video processing system that determines camera parameters and/or z_near/z_far parameters for depth-maps. The z_near and z_far parameters are also referred to as depth parameters. The input is usually from several cameras. If there is only one camera, there may be only 2D video. Then, the camera parameters are usually not needed for displaying the 2D video.

The encoder 310 further comprises a memory 312 for storing some of the camera and depth-map parameters and other information and an output section 314 for sending the configured and/or compressed camera parameters and/or depth parameters.

The decoder 320 comprises an input section 324 for receiving the camera parameters and/or depth parameters from the encoder 310. These camera parameters and/or depth parameters are processed by a processing circuit 321, such as a processor, and used by a view synthesizer 323 to synthesize views. The decoder 320 also comprises a memory 322 for storing e.g. previously received camera and depth parameters.

Figure 7:
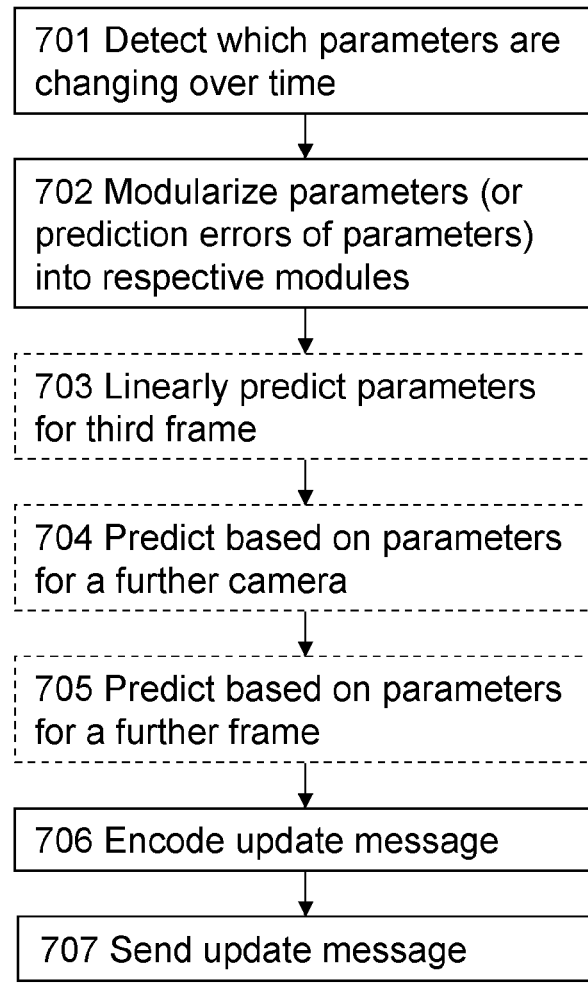
FIG. 7 is a schematic flowchart, illustrating the exemplifying method of FIG. 4, when seen from the encoder.
Figure 9:
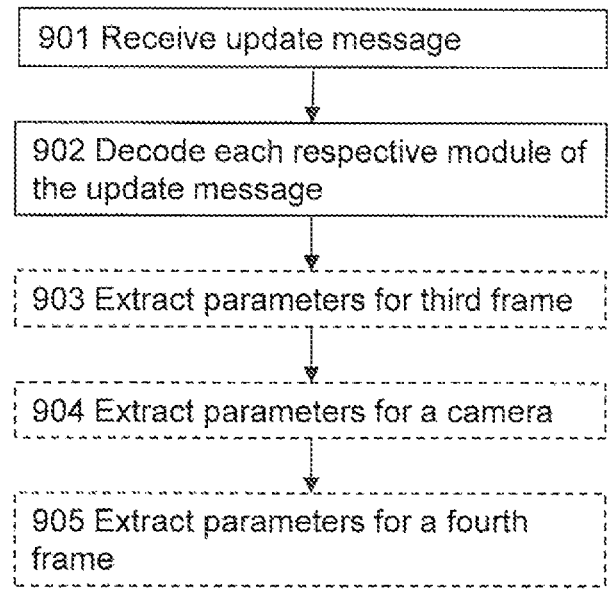
FIG. 9 is a schematic flowchart, illustrating the exemplifying method of FIG. 4, when seen from the decoder.

According to embodiments herein, the encoder 310 may be comprised in a first device as shown in FIG. 7 and the decoder 320 may be comprised in a second device as shown in FIG. 9.

As used herein the expression "device" may refer to a user equipment, a mobile phone, a cellular phone, a Personal Digital Assistant (PDA) equipped with radio communication capabilities, a smartphone, a laptop equipped with an internal or external mobile broadband modem, a sensor device equipped with radio communication capabilities, a portable electronic radio communication device or the like.

As it was mentioned earlier, some camera parameters can be constant over the sequence of frames while some parameters can change as often as every frame. These parameters may need to be sent to the receiver, i.e. the decoder 320, for the view synthesis.

In the following, according to different embodiments, methods for reduction of bitrate needed for transmitting the camera parameters and/or depth parameters are described. In particular, prediction, by the encoder 310, of camera parameters and/or depth parameters for transmission or prediction, by the decoder 320, of camera parameters and/or depth parameters from received camera parameters is described.

Figure 4:
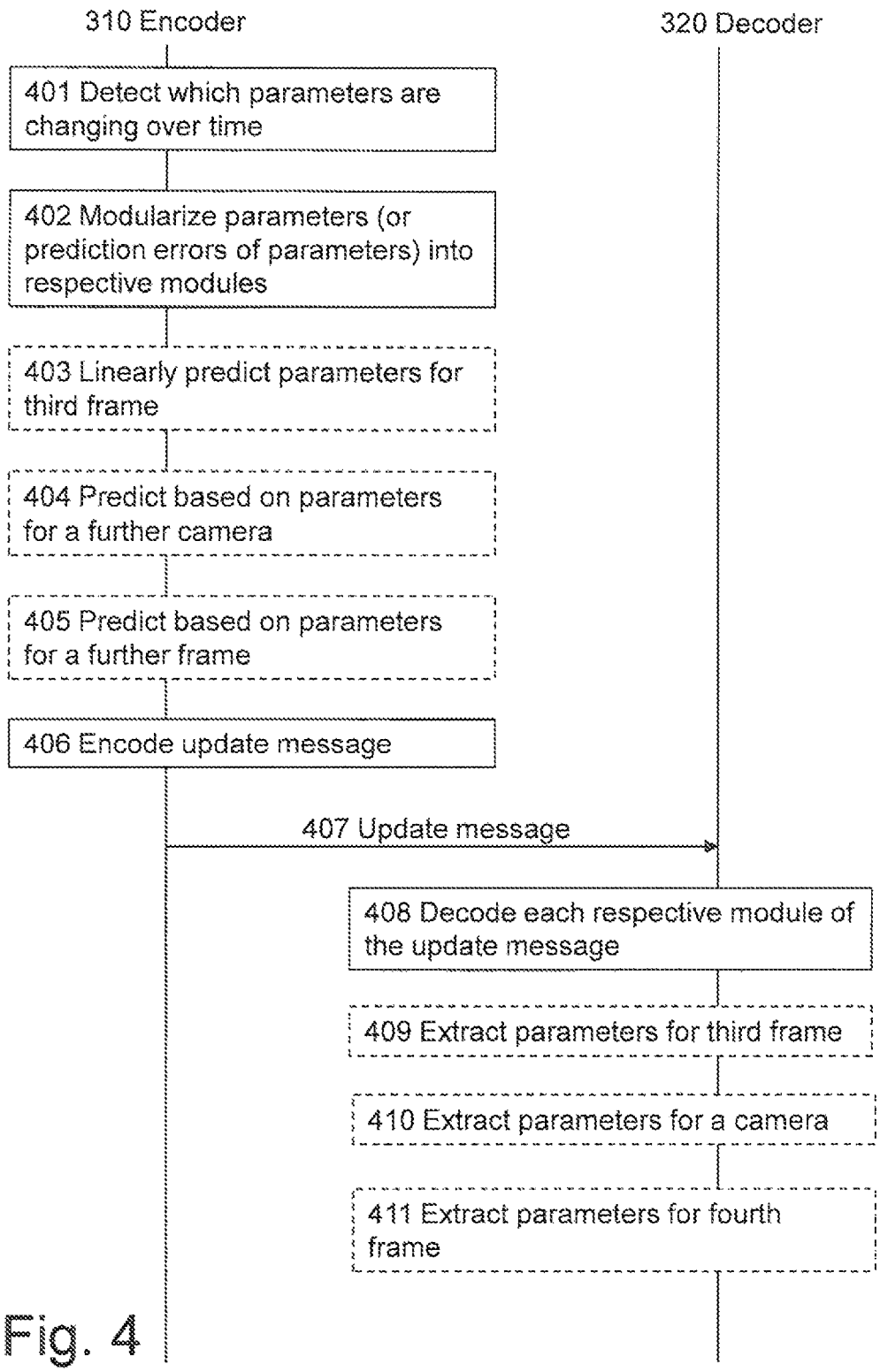
FIG. 4 is a schematic, combined signaling and flowchart, illustrating an exemplifying method according to embodiments implemented in the system of FIG. 3, FIG. 5a-5d are block diagrams, illustrating display order and encoding order.

With reference to FIG. 4, a combined signaling and flowchart illustrates an exemplifying method when implemented in the communication system 100 according to FIG. 3. The encoder 310 performs a method for providing an update message relating to at least one of camera parameters and depth parameters. Thus, the decoder 320 performs a method for decoding the update message relating to the at least one of the camera parameters and the depth parameters. The at least one of the camera parameters and the depth parameters enables the decoder 320 to synthesize a first view for a first camera position based on a second view for a second camera position and said at least one of the camera parameters and the depth parameters. The at least one of the camera parameters and depth parameters relate to the second view.

The update message may be a SEI message or some other representation.

The update message may comprise a first message and a second message. The first message may comprise the camera parameters and the second message may comprise the depth parameters. See section "Camera parameter update message" and "embodiment 7" below.

The camera parameters may comprise a rotation matrix, wherein the update message may comprise an indication for indicating that the rotation matrix is an identity matrix. See section "embodiment 8" below. The camera parameters may comprise intrinsic parameters, extrinsic parameters and/or the depth parameters may comprise z_near and/or z_far values.

According to some embodiments, the first view relates to a third frame or a fourth frame. In some examples, the third frame is the same frame as the fourth frame.

It shall be understood that the term "camera" does not necessarily refer to a physical camera, but rather to a possible position for a camera for which a view is to be synthesized.

The following actions may be performed in any suitable order.

Action 401

In order to determine which parameters to signal to the decoder 320, the encoder 310 detects which of said at least one of the camera parameters and the depth parameters are changing over time. It may be preferred to send updates for only those parameters that are changing over time. At least some of the parameters that change over time are thus different for the second view as compared to the first view.

As an example, camera parameters and/or depth parameters that change between a second frame of the second view and a first frame of the first view may be sent to the decoder 320. In this example, the first and second frames may relate to different time instances. This example may be combined with temporal prediction as described herein.

As another example, camera parameters and/or depth parameters that change between the second view corresponding to the second camera position and the first view corresponding to the first camera position may be sent to the decoder 320. In this example, the first view and the second view may relate to the same time instance. This example may be combined with inter-view prediction as described herein.

Action 402

When the encoder 310 is aware of which parameters are changing over time or which parameters are changing from the second view to the first view, these parameters may be organized into modules. Hence, the encoder 310 modularizes the detected said at least one of the camera parameters and the depth parameters into a respective module. When the encoder 310 modularizes the at least one of the camera parameters and the depth parameters, the at least one of the camera parameters and the depth parameters is divided, or split, into different modules. In this manner, the at least one of the camera parameters and the depth parameters is put in block, or modules, such than only those parameters that are changing over time are sent to the decoder.

The respective module may relate to intrinsic parameters, extrinsic parameters or depth parameters. See section "embodiment 1".

The respective module may relate to the x component of translation vector, also referred to as translation parameters. See section "embodiment 2".

In further embodiments relating to prediction, each respective module may include a respective difference parameter indicating difference between the predicted camera parameters and real camera parameters and/or the predicted depth parameters and real depth parameters. This may be performed after one or more of actions 403 to 405. See section "embodiment 5".

It should also be noticed that division of the parameters into modules may be fixed (predetermined) and known to both the encoder and decoder. In this case, the encoder only needs to signal, to the decoder, which of the predefined modules are being transmitted.

Action 403

This action relates to temporal prediction.

In order to reduce number of bits transmitted between the encoder 310 and the decoder 320, the encoder 310 and the decoder 320 may agree upon a prediction algorithm. The prediction algorithm is to be used by the encoder 310 during prediction before encoding and by the decoder 320 during extraction after decoding.

Thus, the encoder 310 may linearly predict, based on camera parameters and/or depth parameters for a first frame and a second frame, the at least one of the camera parameters and the depth parameters for a third frame in the vicinity of the first and second frames. In the vicinity of the first and second frames may refer to in the vicinity with regard to time. The first and second frame may be any frames. The first and second frames may be called reference frames since the third frame is predicted with reference to the first and second frames. The third frame may be called a current frame since the third frame may currently be encoded. See section "embodiment 4" below.

The third frame may be located, with respect to time, i.e. display order, between the first and second frames. In other examples, the third frame is located before or after the first and second frames. The first and second frames may be adjacent to each other. The first and second frames may be spaced apart, with respect to time, when the third frame is located between the first and second frames. The first and second frames may also be spaced apart when the third frame is located before or after the first and second frames.

When action 402 relates to prediction, action 403 may be performed before action 402. Equivalently, as mentioned above when action 402 relates to prediction, action 402 may be performed after action 403.

Action 404

This action relates to inter-view prediction.

The encoder 310 may predict the camera parameters and/or depth parameters for a camera, e.g. at the first camera position, based on further camera parameters and/or depth parameters for a further camera, e.g. at the second camera position. The further camera parameters and/or depth parameters may relate to the same time instance for which the predicted camera parameters and/or depth parameters are valid. See section "inter-view prediction".

When action 402 relates to prediction, action 404 may be performed before action 402. Equivalently, as mentioned above when action 402 relates to prediction, action 402 may be performed after action 404.

Action 405

The encoder 310 may predict the camera parameters and/or the depth parameters for a fourth frame based on further camera parameters and/or further depth parameters for a further frame. The fourth frame may relate to the first view. The further frame may relate to the second view. The fourth frame and further frame may relate to different instances of time or different views at the same time. Here, the fourth frame may be the current frame since it is predicted in this action similarly to the third frame. The further camera parameters may be coded parameters for a frame preceding the present frame (in the display order or coding order), such as the third or fourth frame. See section "SEI reference". Expressed differently, the third or fourth frame may be the current, or present, frame, i.e. the frame for which the camera and/or the depth parameters are valid.

When action 402 relates to prediction, action 405 may be performed before action 402. Equivalently, as mentioned above when action 402 relates to prediction, action 402 may be performed after action 405. However, in some examples the modularization may be known to both the encoder and the decoder. Then, the order of the actions may be different from what is shown here.

Prediction as described in action 403 or 404 may be used in connection with the use of the SEI reference according to some embodiments.

Action 406

The encoder 310 encodes each respective module into the update message. As an example, the encoder selects an appropriate format for the update message, such as a format for an SEI message as illustrated in Tables 1-8 according to different embodiments.

The encoding of each respective module may exclude encoding of precision of said at least one of the camera parameters and the depth parameters. It is also possible to encode the updates for as subset of parameters, such as intrinsic parameters, rotation parameters, translation parameters (translation vector), or z_near/z_far. It is also possible to transmit only part of those parameter modules, for example only x component of translation vector. A decision for updating each set of parameters can be taken independently. See section "embodiment 3".

The encoding of each respective module may exclude encoding of the predicted depth parameters. This may be beneficial when the predicted depth parameters do not change over time or when the decoder 320 may predict the depth parameters from the update message. See section "embodiment 6".

The encoding of each respective module may follow coding order of frames to which the camera parameters and/or the depth parameters relate. See section "Support for temporal scalability". In other examples, the encoding of each respective module may follow display order of frames to which the camera parameters and/or the depth parameters relate.

Action 407

The encoder 310 sends the update message to the decoder 320. As encoded in action 406, the update message comprises the respective module for the at least one of the camera parameters and the depth parameters.

In this manner, as mentioned, only parameters among the at least one of the camera parameters and the depth parameters that are changing over time are sent in the SEI message. As a consequence, a fewer number of bits need to be transmitted as compared to without detection and modularization as in action 401 and 402.

Action 408

In this action the decoder 320 performs the decoding of the update message which has been encoded by the encoder 310 in action 406. Therefore, the decoder 320 decodes each respective module of the update message to obtain said at least one of the camera parameters and the depth parameters which are to be updated.

The decoding of each respective module may exclude decoding of precision of said at least one of the camera parameters and the depth parameters. See section "embodiment 3".

Each respective module may include a respective difference parameter indicating difference between the predicted camera parameters and real camera parameters and/or the predicted depth parameters and real depth parameters. The respective difference parameter may herein be referred to as a prediction error. See section "embodiment 5".

The decoding of each respective module excludes decoding of the predicted depth parameters. See section "embodiment 6".

The decoding of each respective module may follow coding order of frames to which said at least one of the camera parameters and the depth parameters relate. See section "Support for temporal scalability".

Action 409

The decoder 320 may, after the decoding in action 408, extract based on camera parameters and/or depth parameters for a first frame and a second frame, the at least one of the camera parameters and the depth parameters for the third frame in the vicinity of the first and second frames. In this action the decoder 320 extracts the camera parameters and/or depth parameters predicted by the encoder 310 in action 403. In the context of actions 409-411, extraction may comprise prediction while using the same or corresponding algorithm as the encoder 310. See section "embodiment 4".

Action 410

The decoder 320 may extract, based on further camera parameters for a further camera, e.g. a further camera view, the camera parameters for a camera, being located at for example the first camera position. In this action the decoder 320 extracts the camera parameters and/or depth parameters predicted by the encoder 310 in action 404. See section "Inter-view prediction".

Action 411

The decoder 320 may extract, based on further camera parameters and/or further depth parameters for a further frame of the same camera, the camera parameters and/or the depth parameters for the fourth frame. In this action the decoder 320 extracts the camera parameters and/or depth parameters predicted by the encoder 310 in action 405. See section "SEI reference".

The embodiments herein may be combined to create further embodiments.

Reusing Part of Parameter Representation (Precision and/or Exponent) in the Parameters Updates A further decrease of number of bits spent on signaling camera parameters can be achieved by updating only parts of the values in the bitstream. For example, the floating point precision used for representing the values may be constant over the sequence (or part of the sequence). Therefore, the precision can be signaled for the whole sequence (or for a group of pictures startine with intra (IDR) frame). These parameters can be signaled in SEI (or other parameter representation) related to the IDR picture. Then, only the mantissa, sign and the exponent are transmitted for the parameter values inside GOP. An even more efficient representation of the parameters would be to send the mantissa, sign and the exponent vales for the "prediction error"(the difference between the real and predicted value of the parameter) of the parameter (see sections "prediction of camera parameters and z_near, z_far values" and "support for temporal scalability" about prediction).

Another way to save bits is to use the same exponent for a number of frames and update only the mantissa part. Then, a bit signaling if the exponent of the parameter is updated shall be added to the SEI message.

Modularization of the Parameters (Embodiment 1-3, 5-8)

As it was explained earlier, only some camera parameters are changing over time in certain scenarios (e.g. only the x component of the translation vector in camera parameters). For example, in 1D (linear) camera arrangement only the x component of the translation vector in the extrinsic camera parameter is changing. Even if the camera baseline distance is changing over time, only x coordinate of the translation vector would change.

Therefore, it would be beneficial to split the camera parameters (and z_near z_far values) into modules, where it is signaled for each module whether the values for every such module are updated. Every module can in its turn include other modules and signaling bits indicating whether the parameters for those modules are updated for the current frame. The values for the parameters in these modules can be updated by sending the new value of the parameter or the prediction error (the difference between the value of the parameter and its predicted value). The form in which the parameter values are updated shall be agreed between the sender and the receiver. The way of signaling the parameter values can be constant for the standard (or a system) or it can be signaled for the particular compressed video sequence (or part of the sequence) by an SEI message or other means.

For example, considering extrinsic camera parameters, the camera rotation matrix can be placed in one module while the camera translation vector is placed in another module. This would be beneficial, for example, in the case of 1D camera arrangement that is commonly used in MPEG three dimensional video (3DV) coding.

Camera Parameter Update Message

It is proposed to use different SEI messages (of different representation) for sending the camera parameters for the IDR frames and sending the updates of camera parameters (for the predicted frames in the GOP). Another solution is just to use different structure for the same SEI message with a flag that shows if the current SEI (representation) is used for all the parameters or for the updates of the parameter. The type of the SEI message (or its structure) can be also derived from the type of access unit to which the SEI message (or representation) belongs. This means that above mentioned first message may have a different structure than the second message.

Differentiating between the types of SEI messages (representations) would allow using more modular structure for SEI message (representation) that contains the parameter updates. In the SEI message for the IDR frame, the modular structure would result in wasting bits on signaling if the parameters in the module are being sent because most of the parameters (or even all the parameters) in such a module are transmitted. The update message would on the contrary benefit from the modular structure since only a part of the parameters is updated.

Inter-view Prediction of Camera Parameters

The camera parameters can also be updated from the camera parameters in another camera corresponding to the same (or a different) moment in time. Then, the update SEI message should be sent with the reference to the camera parameters SEI (or the camera), or another identifier that refers to a sub-bitstream that carries the reference message (and potentially the POC number or frame number of the reference frame). Then, the values of the parameters from another camera can be used with updates for some of the camera parameters that are changing from one camera to another camera. The intrinsic camera parameters are also often the same in all the cameras. For example, in 1D (linear) camera arrangement only the x component of the translation vector in the extrinsic camera parameter is changing (like in MPEG 3DV). This scenario would greatly benefit from using the modular camera parameter structure.

The values for the parameters in these modules can be updated by sending a new value of the parameter or the prediction error (the difference between the current value of the parameter and its predicted value). The prediction order for the cameras can be agreed upon. If the multiview video is coded using a "main view" and a "dependent view" (such as possible using Annex H of H.264/AVC), it is logical to send the parameters for the main view in coding structure and update them in the dependent view. The prediction structure for the parameters can also be signaled explicitly, be derived or be fixed.

The interview prediction of the camera parameters can be combined with temporal prediction of the camera parameter. An example of such combination can use temporal prediction in the main view and inter-view prediction in the dependent views. Another example can use the inter-view prediction in the IDR access unit and temporal prediction between the pictures "inside" the GOP that belong to the same camera. Other combinations of these structures are also possible.

SEI Reference

Another way to improve prediction of camera parameters and z_near/z_far values is to introduce a "SEI reference". Then, the (SEI) parameter update can be based on the (SEI) message that has the parameters values that are close to those of the current SEI. In order to enable reference to another SEI, the "SEI reference" would be introduced. Instead of reference to the SEI message, reference to the frame number (frame_num) can be used. Then the receiver can, for example, use frame_num (or the view number) in order to indicate, where the parameters to be used as prediction are located. The SEI reference may be used in inter-view prediction and/or temporal prediction.

Embodiment 1

In this embodiment, the parameters are split into 3 parts; intrinsic parameters, extrinsic parameters and z_near/z_far values. Each part can be included in the SEI message independently of the other parts, which can make the required hit rate lower in ease if not all the parameters need to be updated for every frame.

Exemplifying SEI messages, or other representations, for multiview acquisition_info are illustrated the tables below. Some specific changes are underlined, other changes may lack underlining. z_near z_far flag and signaling of z_near and z_far are added in this embodiment.

See Table 1 for embodiment 1.

Embodiment 2

In the second embodiment, the camera parameters and z_near/z_far values are updated with the following SEI message multiview_acquisition_update_info( ). One can see that the parameter in the update message can be updated by using a small number of bits. A flag called update_x_only_flag is additionally added. This is done in order to have a possibility of updating the x component of the translation vector separately from the other components. This covers a common scenario of linear (1D) camera arrangement, in which only component x of the translation vector is changing. The fields that are different from the multiview_acquisition_message( ) are highlighted in the table below. These changes mostly include modularization of the parameters in the groups in order to facilitate updates of only those parameters that have changed comparing to the previous frame. See Table 2 for embodiment 2.

Embodiment 3

In the third embodiment the camera parameters and z_near, z_far values are updated with the following SEI message multiview_acquisition_update_info( ). One can see that the parameter in the update message can be updated by using a small number of bits. The parameters in the translation vectors are additionally split into two parts by the flag update_x_only_flag. This is done in order to have a possibility of separating the x component of the translation vector from y and z components. The precision of camera parameters and z_near, z_far values is not signaled as it has been signaled in the multiview_acquisition_info( ) message for an IDR frame. See Table 3 for embodiment 3.

Embodiment 5

In the fifth embodiment, signaling of depth-map parameters z_near and z_far is separated from signaling of camera parameters, as z_near and z_far are characteristics of the depth map and camera parameters are characteristic of camera position. The update messages are used as updates to the parameter values sent for the other frame. Regarding sending camera parameters for the interview case, parameters are sent for the main view and can be updated in the dependent views. In this case, one does not need to resend the intrinsic camera parameters for the dependent view if they are the same as the parameters in the main view.

The updates for the camera parameters in this case can be sent as the difference between the predicted parameter value and the real parameter value as indicated in section "prediction of camera parameters and z_near, z_far values" and "support for temporal scalability".

See Table 5.1-5.4 for embodiment 5.

Embodiment 6

In the sixth embodiment, signaling of parameters z_near and z_far is separated from signaling camera parameters, as z_near and z_far are characteristics of the depth map and camera parameters are characteristics of camera position. The update messages are used as updates to the parameter values sent for the other frame. Regarding sending camera parameters for the inter-view prediction case, parameters are sent for the main view and can be updated in the dependent views. In this case, one does not need to resend the intrinsic camera parameters for the dependent view if they are the same as the parameters in the main view.

The updates to the parameters (including the z_near and z_far values) are sent in this case without the prediction. However, there exists an option to update only the mantissa values. This can be useful when signaling slowly changing parameter values since the mantissa changes more often than the sign and exponent of the parameter value.

See Table 6.1-6.5 for embodiment 6. As shown in Table 6.5, an alternative syntax for z_near and z_far updates as compared to Table 6.4. In this case, sign and exponent are not signaled at all since the whole message with sending z_values can be sent instead.

Embodiment 7

In the seventh embodiment, two different messages are used for signaling of parameters z_near and z_far and for signaling camera parameters, respectively. No update messages are used in this example. Instead, one message type is used for both initialization and update of z-values, and another one is used for both initialization and update of camera parameters. As mentioned above, having separate messages for initialization and update may allow to save bits e.g. in the initialization message (by omitting the flags that indicates which parameter modules to update); likewise, bits may be saved in the update message (e.g. by deriving precision parameters from the initialization message). However, there may be a disadvantage with having separate messages for initialization and update, which is that the value space for different message type (SEI types) may be limited and it may be undesirable to consume two types (SEI types) for one type of signaling. There may also be problems with error propagation in case of packet losses when e.g. the precision parameters are omitted. Thus one type of SEI per parameter type is used in this example.

For the view_acquisition info, three different modules are defined, "intrinsic_param", "rotation_param", and "translation_param". For each of them a flag is sent that indicates whether the respective parameters are updated. In case "translation_param_flag" is set, there is another option (flag) to update only the x component.

In case a parameter module is not updated, the respective value from the reference picture is used (e.g. closest previous picture in terms of POC or coding order (frame number)). Alternatively (not exemplified), a temporal reference frame indicator (such as POC number) may be used to indicate the reference frame. In case of IDR pictures where no previous pictures are considered available, prediction from another view may be used. The reference view may either be the same view that is also used for multiview video prediction, or it may be signaled separately, by means of a view identifier (not exemplified here). Furthermore, several views may be used for multi-view prediction.

See Table 7.1-7.2 for embodiment 7.

It is further suggested that one of the respective SEI messages is only sent if any of the parameters is to be updated with respect to the respective reference parameter. For instance, for the camera parameter signaling, this means that if no view_acquisition_info message is sent, then it is implicitly assumed that both intrinsic_param_flag=0, rotation_param_flag=0 and translation_param_flag=0. Thus a case with those three flags set to 0 would never occur in an actual view_acqusition_info message, which can be used for further optimization. This is illustrated in the following example (some specific parameters are underlined, where the translation_param_flag is not sent if the other two flags are 0 (since the case with all three flags equal to zero is excluded). See Table 7.3 for Embodiment 7.

Embodiment 8

In the eighth embodiment, certain characteristics of the camera parameter are taken into account in order to further improve compression of the parameters. For example, in case of 1-D (linear) arrangement of camera parameters, the rotation matrix is equal to identity matrix. Therefore, additional bit-rate savings can be achieved by signaling that the rotation matrix is the identity matrix instead of signaling the rotation matrix elements. The syntax for such SEI message is provided in Table 8. This embodiment, and all other embodiments as applicable, can be used alone or can be combined with other embodiments.

With reference to Table 8 for embodiment 8, function "set_identity_rotation_matrix( )" sets (in floating point format) the elements on the main diagonal of rotation matrix equal to 1 and sets all other elements equal to 0.

Prediction of Camera Parameters and z_near, z_far Values

The camera parameters can be predicted from the previous values of camera parameters by use of Differential Pulse Code Modulation (DPCM). DPCM means that for a next value following the previous values, the next value of the parameter is transmitted as the difference between the values for the camera parameter or the z_near and z_far values for the current frame and the value of this parameter in the previous frame in the frame coding order.

Let $p_i$ denote value of the parameter p at frame i. Then, the value of the parameter p in frame i−1 will be $p_{i-1}$. The prediction for the value of the parameter p in the current frame is then $p_i'=p_{i-1}$. It is needed to send the difference between the parameter value and the predicted parameter value. Therefore, the difference value $d_i=p_i-p_i'=p_i-p_{i-1}$ is sent to the receiver.

Another prediction for the camera parameter is a linear prediction from two previous values. This model assumes that the parameter values are changing linearly. Then, the prediction for the parameter value would be the previous parameter value plus the difference between the previous parameter value and the parameter value before the previous one. The residual value is then encoded.

An example of a linear prediction for a parameter is given below. Let the value of the parameter p in frame i−2 be $p_{i-2}$. The prediction for the value of the parameter p in the current frame is then $p_i'=p_{i-1}+(p_{i-1}-p_{i-2})=2*p_{i-1}-p_{i-2}$. The difference between the real and predicted values $d_i=p_i-p_i'=p_i-2*p_{i-1}+p_{i-2}$ is sent to the receiver.

One can also notice that although the residual values are represented by using floating point operations on the original parameter values, the values can be sent exactly. As a parameter value in the MVC format is represented with a chosen precision, it is possible to transmit exactly the same values as sending the parameters independently for every frame. Therefore, no drift of parameter values occur due to prediction.

The intra frame or a frame that contains an Instantaneous Decoding Refresh (IDR) slice that provides random access capabilities to the bitstream should have the camera parameters and z_near, z_far values sent without prediction in order to allow tuning-in to the bitstream. In this case, if linear prediction using two previous values is used, it should be applied only when two previous parameter values starting from the last IDR frame are available. The value of the parameter for the frame following after the IDR-frame should be predicted as the value of the parameter corresponding to the IDR-frame, namely $p_1'=p_0$, if the parameter value for the IDR frame is $p_0$ and the parameter value for the next frame (in coding or display order) is $p_1$.

Support of Temporal Scalability

Coding of the parameters values can be chosen to follow the display order of the frames (e.g. Picture Order Count (POC). However, when using hierarchical B-frames, hierarchical P-frames or any other coding structure that supports temporal scalability, it can be beneficial if the order of predicting the camera parameters is the same as the coding order of the frames (frame number (frame_num). Then, if decoding order of the frames is not the same as the display order, the prediction of the camera parameters should follow the decoding order (or the temporal scalability order).

One way of predicting parameters in the situation would be to repeat the last coded parameter value (i.e. the prediction would use the value of the parameter in the closest POC in the same or low hierarchy level).

Another, usually more efficient, way of encoding the parameters values is to use as prediction the value of the parameter in the closest (in the display order term) frame that lies in the same or lower level of prediction hierarchy. This method is more bit rate efficient, because it implies prediction of parameters from adjacent frames, whereas prediction in video prediction order could incur larger parameter differences and thus larger prediction errors (differences) (larger parameter differences may require more bits to encode prediction differences since the prediction is less efficient).

Above mentioned prediction order are illustrated in FIG. 5a-5d. Prediction of camera parameter following display order improves bit rate efficiency but is potentially less flexible in supporting temporal scalability. Prediction of camera parameter following decoding order supports temporal scalability but may result in higher bit rate. Note that in the figure, the difference between the "decoding order" approach and the "decoding order (alternative)" approach is that the first approach uses strict decoding order for parameter prediction, whereas the second one uses the closest available picture for decoding that is available when decoding order is considered.

Figure 5A:
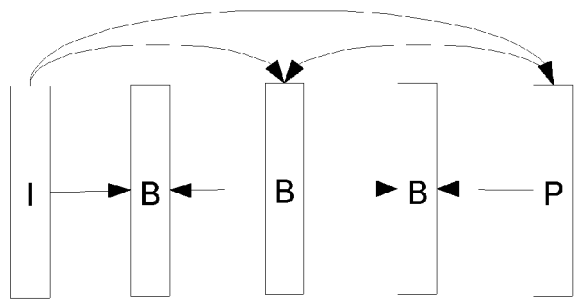

FIG. 5a shows an example of hierarchical B prediction structure.

FIG. 5b shows an example of parameters prediction that follows the display order.

Figure 5C:
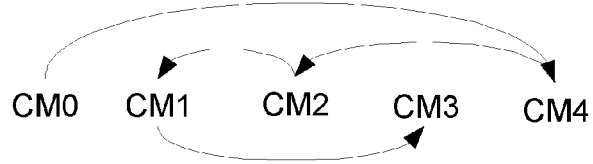

FIG. 5c shows an example of parameter prediction that follows the coding/decoding order where parameter value of the previous frame (in coding order) is used.

Figure 5D:

FIG. 5d shows an alternative example of prediction following the coding/decoding order, where the parameter value of the frame closest to (and preceding) the current frame in the display order is used.

So far two methods were suggested, predicting parameters in video decoding order, or predicting parameters in video display order. In both methods, it is assumed that the prediction order is pre-determined (to be either video decoding order or video display order, or a variation thereof), and the respective prediction difference is sent in a message (e.g. SEI) with every frame. An alternative to those methods of pre-determined prediction order is to have a dynamic prediction order, which means to send an indication which parameters have been used for prediction with the (SEI) message. For example the SEI message could carry a field "reference_poc", which indicates the picture order count of the picture that carried the referenced parameter. Alternatively, it could also contain a "reference_poc_delta", i.e. a difference of the POC of the referenced parameter and the current POC. Another alternative would be to use frame_num as a reference to the frame. In this case, a "reference_frame_num" or a "reference_frame_num_delta" could be sent as indicators for the prediction reference.

The linear prediction for the parameter values is using linear interpolation between the values of the parameters in the frames that stay at the same level in the prediction hierarchy. For example, the parameters in I- and P-frames (or B-frames in the lowest hierarchy level, which is the most important level) can be just sent directly without prediction or the parameters can be predicted from the previous parameter values in the lowest temporal layer. Then, the prediction values for the frames whose display order is between the predicted frames can be found by a linear interpolation between the parameter values. The linear interpolation can also be applied at higher temporal layers of the prediction hierarchy by using the previous temporal layer. In this case, linear interpolation between the parameter values of the two closest frames in the lower temporal layer can be used in order to obtain prediction for another temporal level. A linear interpolation can be implemented as a weighted average of parameter values in two previous (in coding order) frames with the weights proportional to the distance (in display order) between the frames used for parameter prediction and the current (predicted) frame.

Embodiment 4—Linear Prediction of z-values in Case of Hierarchical B-prediction

In the fourth embodiment, an example of linear prediction of a parameter value in case of hierarchical B-frames is described.

Figure 6:
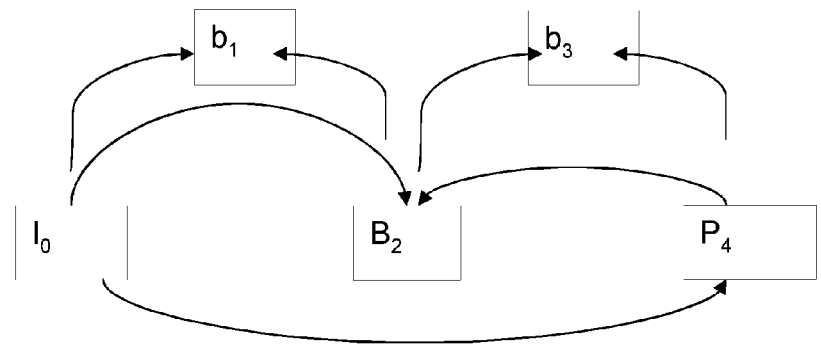
FIG. 6 is an overview illustrating hierarchical prediction structure with three B-frames.

FIG. 6 illustrates hierarchical prediction structure with three B-frames. Let a hierarchical B-prediction structure with three temporal scalable layers be used. $I_0$, $B_2$, $P_4$ denote three frames that can be referenced and $b_2$ and $b_3$ denote two non-reference frames (frames that are not used as references by any other frames).

Parameter p for the frame $I_0$ denoted as $p(I_0)$ is transmitted in multiview_acquisition_info( ) message. Then, the predicted value $p'(P_4)$ is obtained as $p'(P_4)=p(I_0)$. The predicted value of the parameters p for frame $B_2$ is obtained as $p'(B_2)=0.5*p(I_0)+0.5*p'(P_4)$. The predicted values of parameters $b_1$ and $b_3$ are obtained as $p'(b_1)=0.75*p(I_0)+0.25*p'(p_4)$ and $p'(b_3)=0.25*p(I_0)+0.75*p'(p_4)$. An alternative way of obtaining the predicted values of the parameters is $p'(b_1)=0.5*p(I_0)+0.5*p'(B_2)$ and $p'(b_3)=0.5*p(B_2)+0.5*p'(p_4)$.

The predicted values of parameter p are obtained by calculations using the precision specified in the corresponding prec_p field in the multiview_acquisition_info( ) message.

The residual values of parameter p are sent in the multiview_acquisition_update_info( ) message according to one of the described embodiments and added in the receiver to the predicted values p' in order to obtain parameter p values.

FIG. 7 illustrates the exemplifying method of FIG. 4, when seen from the encoder 310. Thus, the encoder 310 performs a method for providing an update message relating to at least one of camera parameters and depth parameters. As mentioned, said at least one of the camera parameters and the depth parameters enables the decoder 320 to synthesize a first view for a first camera position based on a second view for a second camera position and said at least one of the camera parameters and the depth parameters, wherein said at least one of the camera parameters and depth parameters relate to the second view.

As mentioned above, the camera parameters may comprise intrinsic parameters, extrinsic parameters and/or wherein the depth parameters may comprise z_near and/or z_far values.

The camera parameters may comprise a rotation matrix, wherein the update message comprises an indication for indicating that the rotation matrix is an identity matrix.

The following actions may be performed in any suitable order.

Action 701

The encoder 310 detects which of said at least one of the camera parameters and the depth parameters are changing over time. This action is similar to action 401.

Action 702

The encoder 310 modularizes 402 the detected said at least one of the camera parameters and the depth parameters into a respective module. This action is similar to action 402.

In some embodiments, the respective module relates to intrinsic parameters, extrinsic parameters or depth parameters. The respective module may relate to the x component of translation parameters (translation vector). Each respective module may include a respective difference parameter indicating difference between the predicted camera parameters and real camera parameters and/or the predicted depth parameters and real depth parameters.

In some embodiments, modularization of some parameters may be fixed (predetermined) and known both to encoder and decoder. The encoder then should only signal to the decoder which modules are transmitted in the current message and which are not transmitted.

Action 703

This action may be performed before action 702. The encoder 310 linearly predicts, based on camera parameters and/or depth parameters for a first and a second frame, the camera parameters and/or the depth parameters for a third frame in the vicinity of the first and second frames. This action is similar to action 403.

Action 704

The encoder 310 predicts the camera parameters and/or depth parameters for a camera based on further camera parameters and/or further depth parameters for a further camera. This action is similar to action 404.

Action 705

The encoder 310 predicts the camera parameters and/or the depth parameters for the fourth frame based on further camera parameters and/or further depth parameters for a further frame. This action is similar to action 405.

Action 706

The encoder 310 encodes each respective module into the update message. The encoding of each respective module may exclude encoding of precision of the camera parameters and/or the depth parameters (a respective difference parameter indicating difference between the predicted camera parameters and real camera parameters and/or the predicted depth parameters and real depth parameters). The encoding of each respective module may exclude encoding of the depth parameters (or the difference between the predicted depth parameters and the real depth parameters). The encoding of each respective module may follow coding order, or display order, of frames to which the camera parameters and/or the depth parameters relate.

The update message may comprise a first message and a second message, wherein the first message comprises the camera parameters and the second message comprises the depth parameters.

This action is similar to action 406.

Action 707

The encoder 310 sends the update message to the decoder 320. This action is similar to action 407.

Figure 8:
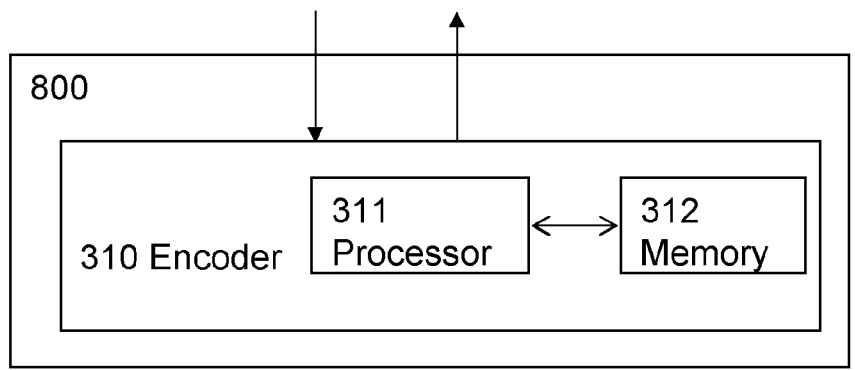
FIG. 8 is a schematic block diagram of an exemplifying encoder configured to perform the method of FIGS. 4 and/or 7.

FIG. 8 depicts an exemplifying encoder 310 configured to perform the method of FIGS. 4 and/or 6. Thus, the encoder 310 is configured to provide an update message relating to camera parameters and/or depth parameters. As mentioned, the camera parameters and/or the depth parameters enable a decoder 320 to synthesize a first view for a first camera position based on a second view for a second camera position and one or more of the camera parameters and the depth parameters. The camera parameters and/or depth parameters relate to the second view.

As mentioned, the camera parameters may comprise intrinsic parameters, extrinsic parameters, and/or wherein the depth parameters may comprise z_near and/or z_far values. The respective module may relate to intrinsic parameters, extrinsic parameters or depth parameters. The respective module may relate to the x component of translation parameters. As mentioned, each respective module may include a respective difference parameter indicating difference between the predicted camera parameters and real camera parameters and/or the predicted depth parameters and real depth parameters.

The update message may comprise a first message and a second message, wherein the first message comprises the camera parameters and the second message comprises the depth parameters.

The camera parameters may comprise a rotation matrix, wherein the update message may comprise an indication for indicating that the rotation matrix is an identity matrix.

In some embodiments, a first device 800 may comprise the encoder 310.

As mentioned, the encoder 310 comprises a processing circuit 311, such as a processor, configured to:

modularize at least one of the camera parameters and the depth parameters into a respective module;
encode each respective module into the update message; and
send the update message to the decoder 320.

The processing circuit 311 may further be configured to exclude encoding of precision of the camera parameters and/or the depth parameters when encoding each respective module.

The processing circuit 311 may further be configured to:
before the modularizing, linearly predict, based on camera parameters and/or depth parameters for a first and a second frame, the camera parameters and/or the depth parameters for a third frame in the vicinity of the first and second frames.

The processing circuit 311 may further be configured to exclude encoding of the predicted depth parameters when encoding each respective module.

The processing circuit 311 may be configured to follow coding order of frames to which the camera parameters and/or the depth parameters relate when encoding each respective module. Alternatively, the processing circuit 311 may be configured to follow display order of frames to which the camera parameters and/or the depth parameters relate when encoding each respective module.

The processing circuit 311 may be configured to predict the camera parameters for a camera based on further camera parameters for a further camera.

The processing circuit 311 may be configured to predict the camera parameters and/or the depth parameters for the fourth frame based on further camera parameters and/or further depth parameters for a further frame.

The encoder 310 further comprises a memory 312 for storing software to be executed by, for example, the processing circuit 311. The software may comprise instructions to enable the processing circuit to perform the method in the encoder 310 as described above in conjunction with FIGS. 4 and/or 6.

FIG. 9 illustrates the exemplifying method of FIG. 4, when seen from the decoder 320. Thus, the decoder 320 performs a method for decoding an update message relating to camera parameters and/or depth parameters. As mentioned, the camera parameters and/or the depth parameters enables the decoder 320 to synthesize a first view for a first camera position based on a second view for a second camera position and one or more of the camera parameters and the depth parameters. The camera parameters and/or depth parameters relate to the second view.

As mentioned, the camera parameters may comprise intrinsic parameters, extrinsic parameters and/or translation parameters, and/or wherein the depth parameters may comprise z_near and/or z_far values. The camera parameters may comprise a rotation matrix, wherein the update message may comprise an indication for indicating that the rotation matrix is an identity matrix.

The following actions may be performed in any suitable order.

Action 901

The decoder 320 receives the update message from an encoder 310, wherein the update message comprises a respective module for at least one of the camera parameters and the depth parameters. This action is similar to action 407.

As mentioned, the update message may comprise a first message and a second message, wherein the first message may comprise the camera parameters and the second message may comprise the depth parameters.

The respective module may relate to intrinsic parameters, extrinsic parameters or depth parameters. The respective module may relate to the x component of translation parameters (translation vector). Each respective module may include a respective difference parameter indicating the difference between the predicted camera parameters and real camera parameters and/or the predicted depth parameters and real depth parameters.

Action 902

The decoder 320 decodes each respective module of the update message to obtain the camera parameters and/or the depth parameters which are to be updated. This action is similar to action 408.

The decoding of each respective module may exclude decoding of precision of the camera parameters and/or the depth parameters. The decoding of each respective module may exclude decoding of the predicted depth parameters. The decoding of each respective module may follow coding order, or display order, of frames to which the camera parameters and/or the depth parameters relate.

Action 903

It is preferred that this action is performed after action 902. The decoder 320 may extract, based on camera parameters and/or depth parameters for a first and a second frame, the camera parameters and/or the depth parameters for a third frame in the vicinity of the first and second frames.

This action is similar to action 409.

Action 904

The decoder 320 may extract, based on further camera parameters and/or further depth parameters for a further camera the camera parameters and/or depth parameters for a camera. This action is similar to action 410.

Action 905

The decoder 320 may extract, based on further camera parameters and/or further depth parameters for a further frame of the same camera, the camera parameters and/or the depth parameters for the fourth frame. This action is similar to action 411.

Figure 10:
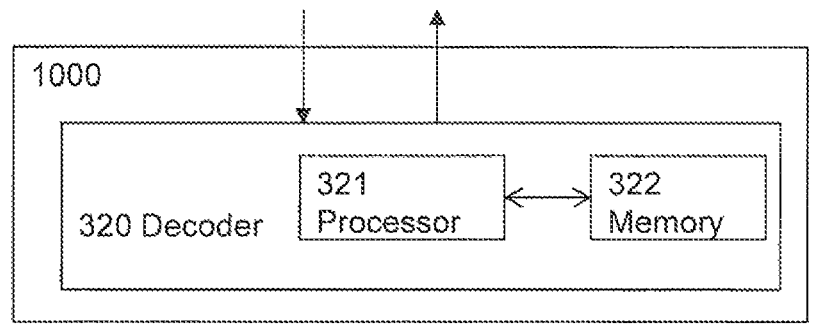
FIG. 10 is a schematic block diagram of an exemplifying decoder configured to perform the method of FIGS. 4 and/or 9.

FIG. 10 shows an exemplifying decoder 320 configured to perform the method of FIGS. 4 and/or 8. Thus, the decoder 320 is configured to decode an update message relating to camera parameters and/or depth parameters. As mentioned, the camera parameters and/or the depth parameters enable the decoder 320 to synthesize a first view for a first camera position based on a second view for a second camera position and one or more of the camera parameters and the depth parameters. The camera parameters and/or depth parameters relate to the second view.

In some embodiments, a second device 1000 comprises the decoder 320.

The camera parameters may comprise intrinsic parameters, extrinsic parameters, and/or wherein the depth parameters may comprise z_near and/or z_far values, The camera parameters may comprise a rotation matrix, wherein the update message may comprise an indication for indicating that the rotation matrix is an identity matrix.

The update message may comprise a first message and a second message, wherein the first message may comprise the camera parameters and the second message may comprise the depth parameters.

The decoder 320 comprises a processing circuit 321, such as a processor, configured to:

receive the update message from an encoder 310, wherein the update message comprises a respective module for at least one of the camera parameters and the depth parameters; and decode each respective module of the update message to obtain the camera parameters and/or the depth parameters.

As mentioned, each respective module includes a respective difference parameter indicating difference between the predicted camera parameters and real camera parameters and/or the predicted depth parameters and real depth parameters. The respective module may relate to intrinsic parameters, extrinsic parameters or depth parameters. The respective module may relate to the x component of translation parameters.

The processing circuit 321 may be configured to exclude decoding of precision of the camera parameters and/or the depth parameters when decoding each respective module.

The processing circuit 321 may further be configured to, after the decoding, extract based on camera parameters and/or depth parameters for a first and a second frame, the camera parameters and/or the depth parameters for a third frame in the vicinity of the first and second frames.

The processing circuit 321 may be configured to exclude decoding of the predicted depth parameters when the decoding each respective module.

The processing circuit 321 may further be configured to follow coding order of frames to which the camera parameters and/or the depth parameters relate when decoding each respective module.

The processing circuit 321 may further be configured to extract the camera parameters for a camera, wherein the extraction is based on further camera parameters for a further camera.

The processing circuit 321 may further be configured to extract, based on further camera parameters and/or further depth parameters for a further frame, the camera parameters and/or the depth parameters for the fourth frame.

The decoder 320 further comprises a memory 322 for storing software to be executed by, for example, the processing circuit. The software may comprise instructions to enable the processing circuit to perform the method in the decoder 320 as described above in conjunction with FIGS. 4 and/or 8.

As used herein, the term "processing circuit" may refer to a processing unit, a processor, an application specific integrated circuit (ASIC), a field-programmable gate array (FPGA) or the like. As an example, a processor, an ASIC, an FPGA or the like may comprise one or more processor kernels.

As used herein, the term "memory" may refer to a hard disk, a magnetic storage medium, a portable computer diskette or disc, flash memory, random access memory (RAM) or the like. Furthermore, the memory may be an internal register memory of a processor.

In some embodiments, the encoder 310 or decoder 320 may be configured for communication over a wired or wireless interface. Further, embodiments herein may comprise communication via a versatile media, such as a DVD or Blu-ray disc. According to some such embodiments, the encoder 310 may comprise, or be connectable to, a media player such as e.g. a DVD/Blu-ray player.

Even though embodiments of the various aspects have been described, many different alterations, modifications and the like thereof will become apparent for those skilled in the art. The described embodiments are therefore not intended to limit the scope of the present disclosure.

Tables

TABLE 0.1

Multi-view acquisition information SEI message syntax

| multiview_acquisition_info( payloadSize ) { | C | Descriptor |
|---|---|---|
| num_views_minus1 | | ue(v) |
| intrinsic_param_flag | 5 | u(1) |
| extrinsic_param_flag | 5 | u(1) |
| if ( intrinsic_param_flag ) { | | |
|    intrinsic_params_equal | 5 | u(1) |
|    prec_focal_length | 5 | ue(v) |

TABLE 0.1-continued

Multi-view acquisition information SEI message syntax

| | C | Descriptor |
|---|---|---|
| multiview_acquisition_info( payloadSize ) { | | |
|     prec_principal_point | 5 | ue(v) |
|     prec_skew_factor | 5 | ue(v) |
|     if( intrinsic_params_equal ) | | |
|         num_of_param_sets = 1 | | |
|     else | | |
|         num_of_param_sets = num_views_minus1 + 1 | | |
|     for( i = 0; i < num_of_param_sets; i++ ) { | | |
|         sign_focal_length_x[ i ] | 5 | u(1) |
|         exponent_focal_length_x[ i ] | 5 | u(6) |
|         mantissa_focal_length_x[ i ] | 5 | u(v) |
|         sign_focal_length_y[ i ] | 5 | u(1) |
|         exponent_focal_length_y[ i ] | 5 | u(6) |
|         mantissa_focal_length_y[ i ] | 5 | u(v) |
|         sign_principal_point_x[ i ] | 5 | u(1) |
|         exponent_principal_point_x[ i ] | 5 | u(6) |
|         mantissa_principal_point_x[ i ] | 5 | u(v) |
|         sign_principal_point_y[ i ] | 5 | u(1) |
|         exponent_principal_point_y[ i ] | 5 | u(6) |
|         mantissa_principal_point_y[ i ] | 5 | u(v) |
|         sign_skew_factor[ i ] | 5 | u(1) |
|         exponent_skew_factor[ i ] | 5 | u(6) |
|         mantissa_skew_factor[ i ] | 5 | u(v) |
|     } | | |
|     if( extrinsic_param_flag ) { | | |
|         prec_rotation_param | 5 | ue(v) |
|         prec_translation_param | 5 | ue(v) |
|         for( i = 0; i <= num_views_minus1; i++) { | | |
|             for ( j = 1; j <= 3; j++) { /* row */ | | |
|                 for ( k = 1; k <= 3; k++) { /* column */ | | |
|                     sign_r[ i ][ j ][ k ] | 5 | u(1) |
|                     exponent_r[ i ][ j ][ k ] | 5 | u(6) |
|                     mantissa_r[ i ][ j ][ k ] | 5 | u(v) |
|                 } | | |
|                 sign_t[ i ][ j ] | 5 | u(1) |
|                 exponent_t[ i ][ j ] | 5 | u(6) |
|                 mantissa_t[ i ][ j ] | 5 | u(v) |
|             } | | |
|         } | | |
|     } | | |
| } | | |

TABLE 0.2

Camera parameter set

| | C | Descriptor |
|---|---|---|
| camera_parameter_set( camera_id ) { | | |
|     prec_focal_length[ camera_id ] | 5 | ue(v) |
|     sign_focal_length[ camera_id ] | 5 | u(1) |
|     exponent_focal_length[ camera_id ] | 5 | u(6) |
|     mantissa_focal_length[ camera_id ] | 5 | u(v) |
|     prec_z_near[ camera_id ] | 5 | ue(v) |
|     sign_z_near[ camera_id ] | 5 | u(1) |
|     exponent_z_near[ camera_id ] | 5 | u(6) |
|     mantissa_z_near[ camera_id ] | 5 | u(v) |
|     prec_z_far[ camera_id ] | 5 | ue(v) |
|     sign_z_far[ camera_id ] | 5 | u(1) |
|     exponent_z_far[ camera_id ] | 5 | u(6) |
|     mantissa_z_far[ camera_id ] | 5 | u(v) |
| } | | |

TABLE 1

| | C | Descriptor |
|---|---|---|
| multiview_acquisition_info( payloadSize ) { | | |
|     num_views_minus1 | | ue(v) |
|     intrinsic_param_flag | 5 | u(1) |
|     extrinsic_param_flag | 5 | u(1) |
|     znear_zfa_flag | 5 | u(1) |
|     if ( intrinsic_param_flag ){ | | |
|         intrinsic_params_equal | 5 | u(1) |
|         prec_focal_length | 5 | ue(v) |
|         prec_principal_point | 5 | ue(v) |
|         prec_skew_factor | 5 | ue(v) |
|         if( intrinsic_params_equal ) | | |
|             num_of_param_sets = 1 | | |
|         else | | |
|             num_of_param_sets = num_views_minus1 + 1 | | |
|         for( i = 0; i < num_of_param_sets; i++ ) { | | |
|             sign_focal_length_x[ i ] | 5 | u(1) |
|             exponent_focal_length_x[ i ] | 5 | u(6) |
|             mantissa_focal_length_x[ i ] | 5 | u(v) |
|             sign_focal_length_y[ i ] | 5 | u(1) |
|             exponent_focal_length_y[ i ] | 5 | u(6) |
|             mantissa_focal_length_y[ i ] | 5 | u(v) |
|             sign_principal_point_x[ i ] | 5 | u(1) |
|             exponent_principal_point_x[ i ] | 5 | u(6) |
|             mantissa_principal_point_x[ i ] | 5 | u(v) |
|             sign_principal_point_y[ i ] | 5 | u(1) |
|             exponent_principal_point_y[ i ] | 5 | u(6) |
|             mantissa_principal_point_y[ i ] | 5 | u(v) |
|             sign_skew_factor[ i ] | 5 | u(1) |
|             exponent_skew_factor[ i ] | 5 | u(6) |
|             mantissa_skew_factor[ i ] | 5 | u(v) |
|         } | | |
|     } | | |
|     if( extrinsic_param_flag ){ | | |
|         prec_rotation_param | 5 | ue(v) |
|         prec_translation_param | 5 | ue(v) |
|         for( i = 0; i <= num_views_minus1; i++) { | | |
|             for ( j = 1; j <= 3; j++) { /* row */ | | |
|                 for ( k = 1; k <= 3; k++) { /* column */ | | |
|                     sign_r[ i ][ j ][ k ] | 5 | u(1) |
|                     exponent_r[ i ][ j ][ k ] | 5 | u(6) |
|                     mantissa_r[ i ][ j ][ k ] | 5 | u(v) |
|                 } | | |
|                 sign_t[ i ][ j ] | 5 | u(1) |
|                 exponent_t[ i ][ j ] | 5 | u(6) |
|                 mantissa_t[ i ][ j ] | 5 | u(v) |
|             } | | |
|         } | | |
|     } | | |
|     if( znear_zfar_flag ){ | | |
|         prec_znear_param | 5 | ue(v) |
|         prec_zfar_param | 5 | ue(v) |
|         sign_znear | 5 | u(1) |
|         exponent_znear | 5 | u(6) |
|         mantissa_znear | 5 | u(v) |
|         sign_znear | 5 | u(1) |
|         exponent_znear | 5 | u(6) |
|         mantissa_znear | 5 | u(v) |
|     } | | |
| } | | |

TABLE 2

| | C | Descriptor |
|---|---|---|
| multiview_acquisition_update_info( payloadSize ) { | | |
|     view_id | | u(10) |
|     update_intrinsic_param_flag | 5 | u(1) |
|     update_rotation_param_flag | 5 | u(1) |

TABLE 2-continued

| multiview_acquisition_update_info( payloadSize ) { | C | Descriptor |
|---|---|---|
| update translation_param_flag | 5 | u(1) |
| update znear_zfar_flag | 5 | u(1) |
| if ( update intrinsic param flag ) { | | |
|     intrinsic_params_equal | 5 | u(1) |
| ... | | |
|     prec_focal_length | 5 | ue(v) |
|     prec_principal_point | 5 | ue(v) |
|     prec_skew_factor | 5 | ue(v) |
|     sign_focal_length_x | 5 | u(1) |
|     exponent_focal_length_x | 5 | u(6) |
|     mantissa_focal_length_x | 5 | u(v) |
|     sign_focal_length_y | 5 | u(1) |
|     exponent_focal_length_y | 5 | u(6) |
|     mantissa_focal_length_y | 5 | u(v) |
|     sign_principal_point_x | 5 | u(1) |
|     exponent_principal_point_x | 5 | u(6) |
|     mantissa_principal_point_x | 5 | u(v) |
|     sign_principal_point_y | 5 | u(1) |
|     exponent_principal_point_y | 5 | u(6) |
|     mantissa_principal_point_y | 5 | u(v) |
|     sign_skew_factor | 5 | u(1) |
|     exponent_skew_factor | 5 | u(6) |
|     mantissa_skew_factor | 5 | u(v) |
| ... | | |
| } | | |
| if( update rotation param flag) { | | |
|     prec_rotation_param | 5 | ue(v) |
|     for ( j = 1; j <= 3; j++) { /* row */ | | |
|         for ( k = 1; k <= 3; k++) { | | |
|         /* column */ | | |
|         sign_r[ j ][ k ] | 5 | u(1) |
|         exponent_r[ j ][ k ] | 5 | u(6) |
|         mantissa_r[ j ][ k ] | 5 | u(v) |
|         } | | |
|     } | | |
| } | | |
| if(update translation param flag ) { | | |
|     updatex_only_flag | 5 | u(1) |
|     if (update x only flag) { | | |
|         sign_t[ 1 ] | 5 | u(1) |
|         exponent_t[ 1 ] | 5 | u(6) |
|         mantissa_t[ 1 ] | 5 | u(v) |
|     } | | |
|     else{ | | |
|         prec_translation_param | 5 | ue(v) |
|         for ( j = 1; j <= 3; j++) { /* row */ | | |
|         sign_t[ j ] | 5 | u(1) |
|         exponent_t[ j ] | 5 | u(6) |
|         mantissa_t[ j ] | 5 | u(v) |
|         } | | |
|     } | | |
| } | | |
| if( update znear zfar flag ) { | | |
|     prec_znear_param | 5 | ue(v) |
|     prec_zfar_param | 5 | ue(v) |
|     sign_znear | 5 | u(1) |
|     exponent_znear | 5 | u(6) |
|     mantissa_znear | 5 | u(v) |
|     sign_znear | 5 | u(1) |
|     exponent_znear | 5 | u(6) |
|     mantissa_znear | 5 | u(v) |
| } | | |
| } | | |

TABLE 3

| multiview_acquisition_update_info( payloadSize ) { | C | Descriptor |
|---|---|---|
| view_id | | u(10) |
| update intrinsic_param_flag | 5 | u(1) |
| update rotation_param_flag | 5 | u(1) |
| update translation_param_flag | 5 | u(1) |
| if ( intrinsic_param_flag ) { | | |
|     intrinsic_params_equal | 5 | u(1) |
| ... | | |
|     sign_focal_length_x | 5 | u(1) |
|     exponent_focal_length_x | 5 | u(6) |
|     mantissa_focal_length_x | 5 | u(v) |
|     sign_focal_length_y | 5 | u(1) |
|     exponent_focal_length_y | 5 | u(6) |
|     mantissa_focal_length_y | 5 | u(v) |
|     sign_principal_point_x | 5 | u(1) |
|     exponent_principal_point_x | 5 | u(6) |
|     mantissa_principal_point_x | 5 | u(v) |
|     sign_principal_point_y | 5 | u(1) |
|     exponent_principal_point_y | 5 | u(6) |
|     mantissa_principal_point_y | 5 | u(v) |
|     sign_skew_factor | 5 | u(1) |
|     exponent_skew_factor | 5 | u(6) |
|     mantissa_skew_factor | 5 | u(v) |
| ... | | |
| } | | |
| if( rotation param flag ) { | | |
|     for ( j = 1; j <= 3; j++) { /* row */ | | |
|         for ( k = 1; k <= 3; k++) { | | |
|         /* column */ | | |
|         sign_r[ j ][ k ] | 5 | u(1) |
|         exponent_r[ j ][ k ] | 5 | u(6) |
|         mantissa_r[ j ][ k ] | 5 | u(v) |
|         } | | |
|     } | | |
| } | | |
| if(translation param flag) { | | |
|     update x_only_flag | 5 | u(1) |
|     if (update x only flag) { | | |
|         sign_t[ 1 ] | 5 | u(1) |
|         exponent_t[ 1 ] | 5 | u(6) |
|         mantissa_t[ 1 ] | 5 | u(v) |
|     } | | |
|     else{ | | |
|         for ( j = 1; j <= 3; j++) { /* row */ | | |
|         sign_t[ j ] | 5 | u(1) |
|         exponent_t[ j ] | 5 | u(6) |
|         mantissa_t[ j ] | 5 | u(v) |
|         } | | |
|     } | | |
| } | | |
| if( znear zfar flag ) { | | |
|     sign_znear | 5 | u(1) |
|     exponent_znear | 5 | u(6) |
|     mantissa_znear | 5 | u(v) |
|     sign_znear | 5 | u(1) |
|     exponent_znear | 5 | u(6) |
|     mantissa_znear | 5 | u(v) |
| } | | |
| } | | |

Table 4 has been omitted in order to match table number against number of embodiment to which the table relates.

TABLE 5.1

| multiview_acquisition_info( payloadSize ) { | C | Descriptor |
|---|---|---|
| intrinsic_param_flag | 5 | u(1) |
| extrinsic_param_flag | 5 | u(1) |
| if ( intrinsic_param_flag ) { | | |
|     prec_focal_length | 5 | ue(v) |
|     prec_principal_point | 5 | ue(v) |
|     prec_skew_factor | 5 | ue(v) |
|     sign_focal_length | 5 | u(1) |
|     exponent_focal_length_x | 5 | u(6) |
|     mantissa_focal_length_x | 5 | u(v) |
|     sign_focal_length_y | 5 | u(1) |
|     exponent_focal_length_y | 5 | u(6) |
|     mantissa_focal_length_y | 5 | u(v) |
|     sign_principal_point_x | 5 | u(1) |

TABLE 5.1-continued

| multiview_acquisition_info( payloadSize ) { | C | Descriptor |
|---|---|---|
|     exponent_principal_point_x | 5 | u(6) |
|     mantissa_principal_point_x | 5 | u(v) |
|     sign_principal_point_y | 5 | u(1) |
|     exponent_principal_point_y | 5 | u(6) |
|     mantissa_principal_point_y | 5 | u(v) |
|     sign_skew_factor | 5 | u(1) |
|     exponent_skew_factor | 5 | u(6) |
|     mantissa_skew_factor | 5 | u(v) |
| } | | |
| if( extrinsic_param_flag ) { | | |
|     prec_rotation_param | 5 | ue(v) |
|     prec_translation_param | 5 | ue(v) |
|     for ( j = 1; j <= 3; j++) { /* row */ | | |
|         for ( k = 1; k <= 3; k++) { | | |
|         /* column */ | | |
|         sign_r j ][ k ] | 5 | u(1) |
|         exponent_r[ j ][ k ] | 5 | u(6) |
|         mantissa_r[ j ][ k ] | 5 | u(v) |
|     } | | |
|     sign_t[ j ] | 5 | u(1) |
|     exponent_t[ j ] | 5 | u(6) |
|     mantissa_t[ j ] | 5 | u(v) |
|     } | | |
| } | | |
| } | | |

TABLE 5.2

| z near far info( payloadSize ) { | C | Descriptor |
|---|---|---|
|     prec_znear_param | 5 | ue(v) |
|     prec_zfar_param | 5 | ue(v) |
|     sign_znear | 5 | u(1) |
|     exponent_znear | 5 | u(6) |
|     mantissa_znear | 5 | u(v) |
|     sign_zfar | 5 | u(1) |
|     exponent_zfar | 5 | u(6) |
|     mantissa_zfar | 5 | u(v) |
| } | | |

TABLE 5.3

| multiview_acquisition_update_info( payloadSize ) { | C | Descriptor |
|---|---|---|
| <u>update intrinsic_param_flag</u> | <u>5</u> | <u>u(1)</u> |
| <u>update rotation_param_flag</u> | <u>5</u> | <u>u(1)</u> |
| <u>update translation_param_flag</u> | <u>5</u> | <u>u(1)</u> |
| if ( update_intrinsic_param_flag ) { | | |
|     sign_focal_length_x | 5 | u(1) |
|     exponent_focal_length_x | 5 | u(6) |
|     mantissa_focal_length_x | 5 | u(v) |
|     sign_focal_length_y | 5 | u(1) |
|     exponent_focal_length_y | 5 | u(6) |
|     mantissa_focal_length_y | 5 | u(v) |
|     sign_principal_point_x | 5 | u(1) |
|     exponent_principal_point_x | 5 | u(6) |
|     mantissa_principal_point_x | 5 | u(v) |
|     sign_principal_point_y | 5 | u(1) |
|     exponent_principal_point_y | 5 | u(6) |
|     mantissa_principal_point_y | 5 | u(v) |
|     sign_skew_factor | 5 | u(1) |
|     exponent_skew_factor | 5 | u(6) |
|     mantissa_skew_factor | 5 | u(v) |
| } | | |
| <u>if( update rotation param flag)</u> { | | |
|     for ( j = 1; j <= 3; j++) { /* row */ | | |
|         for ( k = 1; k <= 3; k++) { | | |
|         /* column */ | | |

TABLE 5.3-continued

| multiview_acquisition_update_info( payloadSize ) { | C | Descriptor |
|---|---|---|
|         sign_r[ j ][ k ] | 5 | u(1) |
|         exponent_r[ j ][ k ] | 5 | u(6) |
|         mantissa_r[ j ][ k ] | 5 | u(v) |
|     } | | |
| } | | |
| } | | |
| <u>if( update translation param flag)</u> { | | |
|     <u>update x_only_flag</u> | <u>5</u> | <u>u(1)</u> |
|     <u>if (update x only flag)</u> { | | |
|         sign_t[ 1 ] | 5 | u(1) |
|         <u>update exponent_flag</u> | <u>5</u> | <u>u(1)</u> |
|         if (update exponent flag) { | | |
|             exponent_t[ 1 ] | 5 | u(6) |
|         } | | |
|         mantissa_t[ 1 ] | 5 | u(v) |
|     } | | |
|     else{ | | |
|         for ( j = 1; j <= 3; j++) { /* row */ | | |
|             sign_t[ j ] | 5 | u(1) |
|             exponent_t[ j ] | 5 | u(6) |
|             mantissa_t[ j ] | 5 | u(v) |
|         } | | |
|     } | | |
| } | | |
| } | | |

TABLE 5.4

| update znear zfar info (payload size ) { | C | Descriptor |
|---|---|---|
|     sign_znear | 5 | u(1) |
|     exponent_znear | 5 | u(6) |
|     mantissa_znear | 5 | u(v) |
|     sign_zfar | 5 | u(1) |
|     exponent_zfar | 5 | u(6) |
|     mantissa_zfar | 5 | u(v) |
| } | | |

TABLE 6.1

| multiview_acquisition_info( payloadSize ) { | C | Descriptor |
|---|---|---|
|     intrinsic_param_flag | 5 | u(1) |
|     extrinsic_param_flag | 5 | u(1) |
|     if ( intrinsic_param_flag ) { | | |
|         prec_focal_length | 5 | ue(v) |
|         prec_principal_point | 5 | ue(v) |
|         prec_skew_factor | 5 | ue(v) |
|         sign_focal_length | 5 | u(1) |
|         exponent_focal_length_x | 5 | u(6) |
|         mantissa_focal_length_x | 5 | u(v) |
|         sign_focal_length_y | 5 | u(1) |
|         exponent_focal_length_y | 5 | u(6) |
|         mantissa_focal_length_y | 5 | u(v) |
|         sign_principal_point_x | 5 | u(1) |
|         exponent_principal_point_x | 5 | u(6) |
|         mantissa_principal_point_x | 5 | u(v) |
|         sign_principal_point_y | 5 | u(1) |
|         exponent_principal_point_y | 5 | u(6) |
|         mantissa_principal_point_y | 5 | u(v) |
|         sign_skew_factor | 5 | u(1) |
|         exponent_skew_factor | 5 | u(6) |
|         mantissa_skew_factor | 5 | u(v) |
|     } | | |
|     if( extrinsic_param_flag ) { | | |
|         prec_rotation_param | 5 | ue(v) |
|         prec_translation_param | 5 | ue(v) |
|         for ( j = 1; j <= 3; j++) { /* row */ | | |
|             for ( k = 1; k <= 3; k++) { | | |
|             /* column */ | | |
|             sign_r [ j ][ k ] | 5 | u(1) |
|             exponent_r[ j ][ k ] | 5 | u(6) |
|             mantissa_r[ j ][ k ] | 5 | u(v) |
|         } | | |

TABLE 6.1-continued

| multiview_acquisition_info( payloadSize ) { | C | Descriptor |
|---|---|---|
| sign_t[ j ] | 5 | u(1) |
| exponent_t[ j ] | 5 | u(6) |
| mantissa_t[ j ] | 5 | u(v) |
| } | | |
| } | | |
| } | | |

TABLE 6.2

| z_near_far_info( payloadSize ) { | C | Descriptor |
|---|---|---|
| prec_znear_param | 5 | ue(v) |
| prec_zfar_param | 5 | ue(v) |
| sign_znear | 5 | u(1) |
| exponent_znear | 5 | u(6) |
| mantissa_znear | 5 | u(v) |
| sign_zfar | 5 | u(1) |
| exponent_ zfar | 5 | u(6) |
| mantissa_zfar | 5 | u(v) |
| } | | |

TABLE 6.3

| multiview_acquisition_update_info( payloadSize ) { | C | Descriptor |
|---|---|---|
| update intrinsic_param_flag | 5 | u(1) |
| update rotation_param_flag | 5 | u(1) |
| update translation_param_flag | 5 | u(1) |
| if ( update_intrinsic_param_flag ) { | | |
| sign_focal_length_x | 5 | u(1) |
| exponent_focal_length_x | 5 | u(6) |
| mantissa_focal_length_x | 5 | u(v) |
| sign_focal_length_y | 5 | u(1) |
| exponent_focal_length_y | 5 | u(6) |
| mantissa_focal_length_y | 5 | u(v) |
| sign_principal_point_x | 5 | u(1) |
| exponent_principal_point_x | 5 | u(6) |
| mantissa_principal_point_x | 5 | u(v) |
| sign_principal_point_y | 5 | u(1) |
| exponent_principal_point_y | 5 | u(6) |
| mantissa_principal_point_y | 5 | u(v) |
| sign_skew_factor | 5 | u(1) |
| exponent_skew_factor | 5 | u(6) |
| mantissa_skew_factor | 5 | u(v) |
| } | | |
| if( update rotation param flag) { | | |
| for ( j = 1; j <= 3; j++) { /* row */ | | |
| for ( k = 1; k <= 3; k++) { | | |
| /* column */ | | |
| sign_r[ j ][ k ] | 5 | u(1) |
| exponent_r[ j ][ k ] | 5 | u(6) |
| mantissa_r[ j ][ k ] | 5 | u(v) |
| } | | |
| } | | |
| } | | |
| if(update translation param flag) { | | |
| update x_only_flag | 5 | u(1) |
| if (update x only flag) { | | |
| update_all_t[1] | 5 | u(1) |
| if(update_all_t[1]){ | | |
| sign_t[ 1 ] | 5 | u(1) |
| exponent_t[ 1 ] | 5 | u(6) |
| } | | |
| mantissa_t[ 1 ] | 5 | u(v) |
| } | | |
| else{ | | |
| for ( j = 1; j <= 3; j++) { /* row */ | | |
| update_all_t[j] | 5 | u(1) |
| if(update_all_t[j]){ | | |

TABLE 6.3-continued

| multiview_acquisition_update_info( payloadSize ) { | C | Descriptor |
|---|---|---|
| sign_t[ j ] | 5 | u(1) |
| exponent_t[ j ] | 5 | u(6) |
| } | | |
| mantissa_t[ j ] | 5 | u(v) |
| } | | |
| } | | |
| } | | |
| } | | |

TABLE 6.4

| update znear zfar info (payload size ) { | C | Descriptor |
|---|---|---|
| update_all_znear | 5 | u(1) |
| if (update all znear){ | | |
| sign_znear | 5 | u(1) |
| exponent_znear | 5 | u(6) |
| } | | |
| mantissa_znear | 5 | u(v) |
| update_all_zfar | 5 | u(1) |
| if (update all zfar){ | | |
| sign_zfar | 5 | u(1) |
| exponent_zfar | 5 | u(6) |
| } | | |
| mantissa_zfar | 5 | u(v) |
| } | | |

TABLE 6.5

| update znear zfar info (payload size ) { | C | Descriptor |
|---|---|---|
| mantissa_znear | 5 | u(v) |
| mantissa_zfar | 5 | u(v) |
| } | | |

TABLE 7.1

| view_acquisition_info( payloadSize ) { | C | Descriptor |
|---|---|---|
| intrinsic_param_flag | 5 | u(1) |
| rotation_param_flag | 5 | u(1) |
| translation_param_flag | 5 | u(1) |
| if ( intrinsic_param_flag ) { | | |
| prec_focal_length | 5 | ue(v) |
| prec_principal_point | 5 | ue(v) |
| prec_skew_factor | 5 | ue(v) |
| sign_focal_length | 5 | u(1) |
| exponent_focal_length_x | 5 | u(6) |
| mantissa_focal_length_x | 5 | u(v) |
| sign_focal_length_y | 5 | u(1) |
| exponent_focal_length_y | 5 | u(6) |
| mantissa_focal_length_y | 5 | u(v) |
| sign_principal_point_x | 5 | u(1) |
| exponent_principal_point_x | 5 | u(6) |
| mantissa_principal_point_x | 5 | u(v) |
| sign_principal_point_y | 5 | u(1) |
| exponent_principal_point_y | 5 | u(6) |
| mantissa_principal_point_y | 5 | u(v) |
| sign_skew_factor | 5 | u(1) |
| exponent_skew_factor | 5 | u(6) |
| mantissa_skew_factor | 5 | u(v) |
| } | | |
| if( rotation_param_flag ) { | | |
| prec_rotation_param | 5 | ue(v) |
| for ( j = 1; j <= 3; j++) { /* row */ | | |
| for ( k = 1; k <= 3; k++) { | | |
| /* column */ | | |
| sign_r[ j ][ k ] | 5 | u(1) |
| exponent_r[ j ][ k ] | 5 | u(6) |
| mantissa_r[ j ][ k ] | 5 | u(v) |
| } | | |
| } | | |
| } | | |

TABLE 7.1-continued

| view_acquisition_info( payloadSize ) { | C | Descriptor |
|---|---|---|
|     if( translation_param_flag ) { | | |
|         prec_translation_param | 5 | ue(v) |
|         update_x_only | 5 | u(1) |
|         if( update_x_only ) { | | |
|             sign_t[ 1 ] | | |
|             exponent_t[ 1 ] | | |
|             mantissa_t[ 1 ] | | |
|         } | | |
|         else { | | |
|             for ( j = 1; j <= 3; j++) { /* row */ | | |
|                 sign_t[ j ] | 5 | u(1) |
|                 exponent_t[ j ] | 5 | u(6) |
|                 mantissa_t[ j ] | 5 | u(v) |
|             } | | |
|         } | | |
|     } | | |
| } | | |

TABLE 7.2

| z_near_far_info( payloadSize ) { | C | Descriptor |
|---|---|---|
|     prec_z_param | 5 | ue(v) |
|     sign_znear | 5 | u(1) |
|     exponent_znear | 5 | u(6) |
|     mantissa_znear | 5 | u(v) |
|     sign_zfar | 5 | u(1) |
|     exponent_zfar | 5 | u(6) |
|     mantissa_zfar | 5 | u(v) |
| } | | |

TABLE 7.3

| view_acquisition_info( payloadSize ) { | C | Descriptor |
|---|---|---|
|     intrinsic_param_flag | 5 | u(1) |
|     rotation_param_flag | 5 | u(1) |
|     if ( !intrinsic param flag and | | |
|     !rotation param flag ) { | | |
|         translation param flag = 1 | | |
|     } | | |
|     else { | | |
|         translation_param_flag | 5 | u(1) |
|     } | | |
|     if ( intrinsic_param_flag ) { | | |
|     ... | | |

TABLE 8

| multiview_acquisition_info( payloadSize ) { | C | Descriptor |
|---|---|---|
|     intrinsic_param_flag | 5 | u(1) |
|     extrinsic_param_flag | 5 | u(1) |
|     if ( intrinsic_param_flag ) { | | |
|         prec_focal_length | 5 | ue(v) |
|         prec_principal_point | 5 | ue(v) |
|         prec_skew_factor | 5 | ue(v) |
|         sign_focal_length | 5 | u(1) |
|         exponent_focal_length_x | 5 | u(6) |
|         mantissa_focal_length_x | 5 | u(v) |
|         sign_focal_length_y | 5 | u(1) |
|         exponent_focal_length_y | 5 | u(6) |
|         mantissa_focal_length_y | 5 | u(v) |
|         sign_principal_point_x | 5 | u(1) |
|         exponent_principal_point_x | 5 | u(6) |
|         mantissa_principal_point_x | 5 | u(v) |
|         sign_principal_point_y | 5 | u(1) |
|         exponent_principal_point_y | 5 | u(6) |
|         mantissa_principal_point_y | 5 | u(v) |

TABLE 8-continued

| multiview_acquisition_info( payloadSize ) { | C | Descriptor |
|---|---|---|
|         sign_skew_factor | 5 | u(1) |
|         exponent_skew_factor | 5 | u(6) |
|         mantissa_skew_factor | 5 | u(v) |
|     } | | |
|     if( extrinsic_param_flag ) { | | |
|         identity_rotation_matrix | 5 | u(1) |
|         if (identity rotation matrix) { | | |
|             set identity rotation matrix( ) | | |
|         } | | |
|         else { | | |
|             prec_rotation_param | 5 | ue(v) |
|             prec_translation_param | 5 | ue(v) |
|             for ( j = 1; j <= 3; j++) { /* row*/ | | |
|                 for ( k = 1; k <= 3; k++) { | | |
|                 /* column */ | | |
|                     sign_r [ j ][ k] | 5 | u(1) |
|                     exponent_r[ j ][ k ] | 5 | u(6) |
|                     mantissa_r[ j ][ k ] | 5 | u(v) |
|                 } | | |
|                 sign_t[ j ] | 5 | u(1) |
|                 exponent_t[ j ] | 5 | u(6) |
|                 mantissa_t[ j ] | 5 | u(v) |
|             } | | |
|         } | | |
|     } | | |
| } | | |

| set_identity_rotation_matrix( ) { | C | Descriptor |
|---|---|---|
|     for ( j = 1; j <= 3; j++) { /* row */ | | |
|         for ( k = 1; k <= 3; k++) { /* column */ | | |
|             if( k == j) { | | |
|                 sign_r [ j ][ k ] = 0 | | |
|                 exponent_r[ j ][ k ] = 31 | | |
|                 mantissa_r[ j ][ k ] = 0 | | |
|             } | | |
|             else { | | |
|                 sign_r [ j ][ k ] = 0 | | |
|                 exponent_r[ j ][ k ] = 0 | | |
|                 mantissa_r[ j ][ k ] = 0 | | |
|             } | | |
|         } | | |
|     } | | |
| } | | |

The invention claimed is:

1. A method in an encoder for providing an update message relating to at least one of camera parameters and depth parameters, wherein said at least one of the camera parameters and the depth parameters enables a decoder to synthesize a first view for a first camera position based on a second view for a second camera position and said at least one of the camera parameters and the depth parameters, wherein said at least one of the camera parameters and depth parameters relate to the second view, wherein the method comprises:
   detecting which of said at least one of the camera parameters and the depth parameters are changing over time;
   modularizing the detected said at least one of the camera parameters and the depth parameters into a respective module;
   encoding each respective module into the update message; and
   sending the update message to the decoder,
   wherein the camera parameters comprise a rotation matrix, and
   wherein the update message comprises an indication for indicating that the rotation matrix is an identity matrix.

2. The method according to claim 1, wherein the camera parameters comprise intrinsic parameters, extrinsic parameters and/or wherein the depth parameters comprise z_near and/or z_far values.

3. The method according to claim 1, Wherein the respective module relates to intrinsic parameters, extrinsic parameters or depth parameters.

4. The method according to claim 1, wherein the method further comprises, before the modularizing:
linearly predicting, based on camera parameters and/or depth parameters for a first frame and a second frame, said at least one of the camera parameters and the depth parameters for a third frame in the vicinity of the first and second frames.

5. The method according to claim 1, wherein the update message comprises a first message and a second message, wherein the first message comprises the camera parameters and the second message comprises the depth parameters.

6. The method according to claim 1, wherein the method further comprises:
predicting the camera parameters and/or the depth parameters for a camera based on further camera parameters and/or further depth parameters for a further camera.

7. A method in a decoder for decoding an update message relating to at least one of camera parameters and depth parameters, wherein said at least one of the camera parameters and the depth parameters enables the decoder to synthesize a first view for a first camera position based on a second view for a second camera position and said at least one of the camera parameters and the depth parameters, wherein said at least one of the camera parameters and the depth parameters relate to the second view, wherein the method comprises:
receiving the update message from an encoder, wherein the update message comprises a respective module for at least one of the camera parameters and the depth parameters; and
decoding each respective module of the update message to obtain said at least one of the camera parameters and the depth parameters which are to be updated,
wherein the camera parameters comprise a rotation matrix, and
wherein the update message comprises an indication for indicating that the rotation matrix is an identity matrix.

8. The method according to claim 7, wherein the camera parameters comprise intrinsic parameters, extrinsic parameters and/or translation parameters, and/or wherein the depth parameters comprise z_near and/or z_far values.

9. The method according to claim 7, wherein the respective module relates to intrinsic parameters, extrinsic parameters or depth parameters.

10. The method according to claim 7, wherein the method further comprises, after the decoding:
extracting based on camera parameters and/or depth parameters for a first frame and a second frame, said at least one of the camera parameters and the depth parameters for a third frame in the vicinity of the first and second frames.

11. The method according to claim 10, wherein each respective module includes a respective difference parameter indicating difference between the predicted camera parameters and real camera parameters and/or the predicted depth parameters and real depth parameters.

12. The method according to claim 7, wherein the update message comprises a first message and a second message, wherein the first message comprises the camera parameters and the second message comprises the depth parameters.

13. An encoder configured to provide an update message relating to at least one of camera parameters and depth parameters, wherein said at least one of the camera parameters and the depth parameters enables a decoder to synthesize a first view for a first camera position based on a second view for a second camera position and said at least one of the camera parameters and the depth parameters, wherein said at least one of the camera parameters and the depth parameters relate to the second view, wherein the encoder comprises a processing circuit configured to:
detect which of said at least one of the camera parameters and the depth parameters are changing over time;
modularize said at least one of the camera parameters and the depth parameters into a respective module;
encode each respective module into the update message; and
send the update message to the decoder,
wherein the camera parameters comprise a rotation matrix, and
wherein the update message comprises an indication for indicating that the rotation matrix is an identity matrix.

14. The encoder according to claim 13, wherein the camera parameters comprise intrinsic parameters, extrinsic parameters, and/or wherein the depth parameters comprise z_near and/or z_far values.

15. The encoder according to claim 13, wherein the respective module relates to intrinsic parameters, extrinsic, parameters or depth parameters.

16. The encoder according to claim 13, wherein the processing circuit further is configured to:
before the modularizing, linearly predict, based on camera parameters and/or depth parameters for a first frame and a second frame, said at least one of the camera parameters and the depth parameters for a third frame in the vicinity of the first and second frames.

17. The encoder according to claim 16, wherein each respective module includes a respective difference parameter indicating difference between the predicted camera parameters and real camera parameters and/or the predicted depth parameters and real depth parameters.

18. The encoder according to claim 13, wherein the update message comprises a first message and a second message, wherein the first message comprises the camera parameters and the second message comprises the depth parameters.

19. A first device comprising the encoder according to claim 13.

20. A decoder configured to decode an update message relating to at least one of camera parameters and depth parameters, wherein said at least one of the camera parameters and the depth parameters enables the decoder to synthesize a first view for a first camera position based on a second view for a second camera position and said at least one of the camera parameters and the depth parameters, wherein said at least one of the camera parameters and depth parameters relate to the second view, wherein the decoder comprises a processing circuit configured to:
receive the update message from an encoder, wherein the update message comprises a respective module for at least one of the camera parameters and the depth parameters; and
decode each respective module of the update message to obtain said at least one of the camera parameters and the depth parameters,
wherein the camera parameters comprise a rotation matrix, and
wherein the update message comprises an indication for indicating that the rotation matrix is an identity matrix.

21. The decoder according to claim 20, wherein the camera parameters comprise intrinsic parameters, extrinsic parameters and/or translation parameters, and/or wherein the depth parameters comprise z_near and/or z_far values.

22. The decoder according to claim 20, wherein the respective module relates to intrinsic parameters, extrinsic parameters or depth parameters.

23. The decoder according to claim 20, wherein the processing circuit is configured to, after the decoding, extract based on camera parameters and/or depth parameters for a first frame and a second frame, said at least one of the camera parameters and the depth parameters for a third frame in the vicinity of the first and second frames.

24. The decoder according to claim 23, wherein each respective module includes a respective difference parameter indicating difference between the predicted camera parameters and real camera parameters and/or the predicted depth parameters and real depth parameters.

25. The decoder according to claim 20, wherein the update message comprises a first message and a second message, wherein the first message comprises the camera parameters and the second message comprises the depth parameters.

26. A second device comprising the decoder according to claim 20.

* * * * *